(12) United States Patent
Fukuta et al.

(10) Patent No.: US 7,474,478 B2
(45) Date of Patent: Jan. 6, 2009

(54) IMAGE PICKUP LENS, IMAGE PICKUP APPARATUS AND MOBILE TERMINAL

(75) Inventors: Yasunari Fukuta, Sakai (JP); Susumu Yamaguchi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 15 days.

(21) Appl. No.: 11/784,970

(22) Filed: Apr. 10, 2007

(65) Prior Publication Data

US 2007/0242370 A1    Oct. 18, 2007

(30) Foreign Application Priority Data

Apr. 13, 2006    (JP)    ............... 2006-110565

(51) Int. Cl.
*G02B 9/34* (2006.01)
*B02B 3/02* (2006.01)
(52) U.S. Cl. ...................... 359/773; 359/715
(58) Field of Classification Search ......... 359/771–773, 359/708, 715, 766
See application file for complete search history.

(56) References Cited

U.S. PATENT DOCUMENTS 7,289,278 B1 * 10/2007 Jo et al. ............... 359/773

FOREIGN PATENT DOCUMENTS

| JP | 2002-365529 | 12/2002 |
|---|---|---|
| JP | 2002-365530 | 12/2002 |
| JP | 2002-365531 | 12/2002 |
| JP | 2004-341013 | 12/2004 |

* cited by examiner

*Primary Examiner*—William C Choi
*Assistant Examiner*—Jack Dinh
(74) *Attorney, Agent, or Firm*—Cohen Pontani Lieberman & Pavane LLP

(57) ABSTRACT

The present invention provides an image pickup lens for forming a light flux from a subject into an image on an image pickup element, and the image pickup lens includes, in order from an object side thereof: an aperture stop; a first lens having a positive refractive power; a second lens having a negative refractive power and comprising a concave surface facing an image side of the image pickup lens; a third lens having a positive refractive power; and a fourth lens having a negative refractive power and comprising a concave surface facing the image side. The image pickup lens satisfies the predetermined condition according to a curvature radius of the surface facing the image side on the second lens, and a focal length of the image pickup lens.

11 Claims, 17 Drawing Sheets

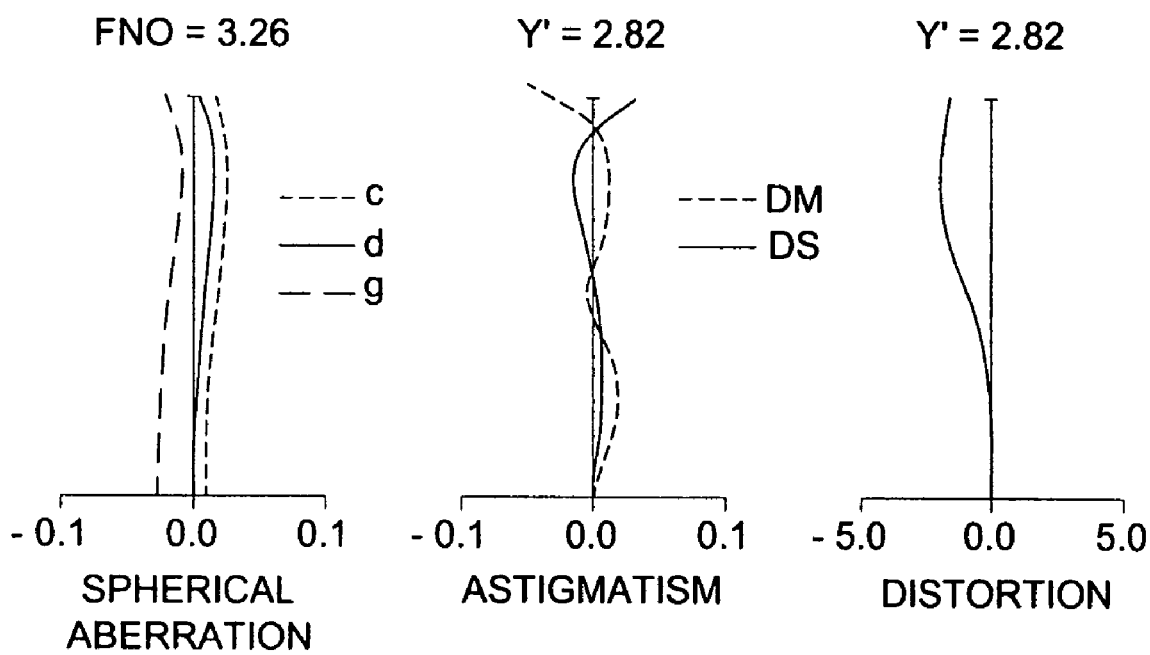

IMAGE PICKUP LENS, IMAGE PICKUP APPARATUS AND MOBILE TERMINAL

This application is based on Japanese Patent Application No. 2006-110565 filed on Apr. 13, 2006, in Japanese Patent Office, the entire content of which is hereby incorporated by reference.

TECHNICAL FIELD

The present invention relates to an image pickup lens and an image pickup apparatus, and further, to a mobile terminal equipped with an image pickup apparatus.

BACKGROUND

Heretofore, a small-sized and thin model image pickup apparatus has been mounted on a mobile terminal such as a cell-phone and PDA (Personal Digital Assistant), and thereby, mutual transmission of not only sound information but also image information to remote places has become possible. As an image pickup element used for the image pickup apparatus, there are used a CCD (Charge Coupled Device) type and an image pickup element of a CMOS (Complementary Metal-Oxide Semiconductor) type.

With the recent increasing spread of these mobile terminals, there are now supplied, to the market, the mobile terminals each carrying an image pickup apparatus employing an image pickup element having a large number of pixels to obtain images with higher image quality. Some of these image pickup apparatuses employ an image pickup lens that is composed of a plurality of lenses for the purpose of an improvement of resolution, corresponding to image pickup elements having a large number of pixels. As an image pickup lens corresponding to an image pickup apparatuses having a large number of pixels, there has been proposed an image pickup lens composed of four lenses which can provide higher performance than a lens composed of two or three lenses.

As the image pickup lens composed of four lenses, Japanese Patent Publication Open to Public Inspection (JP-A) No. 2004-341013 discloses a so-called inverted Ernostar type image pickup lens. The inverted Ernostar type image pickup lens is composed, in the order from the photographic subject side, of the first lens having a positive refractive power, the second lens having a negative refractive power, the third lens having a positive refractive power, and the fourth lens having a positive refractive power, to achieve higher performance. Further, each of JP-A 2002-365529, 2002-365530, and 2002-365531 discloses an image pickup lens of a so-called telephoto type. The image pickup lens of the telephoto type is composed, in the order from the photographic subject side, of the first lens having a positive refractive power, the second lens having a negative refractive power, the third lens having a positive refractive power, and the fourth lens having a negative refractive power, to achieve a smaller size in terms of the total length of the image pickup lens.

However, the image pickup lens described in JP-A 2004-341013 has a positive fourth lens due to the inverted Ernostar type which provides a principal point position of the optical system closer to the image side and a longer back focus, compared with an image pickup lens of telephoto type which provides a negative fourth lens. Therefore, such type of image pickup lens as described in JP-A 2004-341013 is disadvantageous for downsizing. In addition, there is provided only one lens having negative refractive power among four lenses in the image pickup lens. Thus, it provides a difficulty in correction of Petzval sum, and in securing excellent performance on the periphery portion of the image area. The image pickup lens described in each of JP-A 2002-365529, 2002-365530, and 2002-365531 has a narrower imaging field angle and insufficiently corrects its aberrations. If the total length of the image pickup lens is further shortened, it becomes difficult to be used with an image pickup element with a large number of pixels due to deterioration of its performance.

SUMMARY

The invention has been achieved with a background of the aforesaid circumstances, and an object of the invention is to provide an image pickup lens, an image pickup apparatus and a mobile terminal, each of which is small-sized and is capable of securing a wide field angle, correcting various aberrations excellently and coping with image pickup element with a large number of pixels.

To solve the above problems, the present invention provides an embodiment which is an image pickup lens for forming a light flux from a subject into an image on an image pickup element. The image pickup lens comprises, in order from an object side thereof: an aperture stop; a first lens having a positive refractive power; a second lens having a negative refractive power and comprising a concave surface facing an image side of the image pickup lens; a third lens having a positive refractive power; and a fourth lens having a negative refractive power and comprising a concave surface facing the image side. The image pickup lens satisfies $0.2 < r4/f \leq 0.52$, where r4 is a curvature radius of the surface of the second lens facing the image side, and f is a focal length of the image pickup lens.

In the image pickup apparatus, the surface facing the image side on the second lens can be an aspherical surface such that a farther position on the aspherical surface from an optical axis has a smaller negative refractive power.

In the image pickup apparatus, the surface of the fourth lens facing image side also can be an aspherical surface such that a farther position on the aspherical surface from an optical axis has a smaller negative refractive power and the aspherical surface has an inflection point on a periphery of the fourth lens.

In the image pickup apparatus, a surface of the third lens facing the image side can also be an aspherical surface such that a farther position on the aspherical surface from an optical axis has a smaller positive refractive power.

The image pickup apparatus can satisfy $0.8 < f12/f < 3$, where f12 is a composite focal length of the first lens and the second lens.

The image pickup apparatus can also satisfy $-1.5 < r8/r6 < -0.2$, where r6 is a curvature radius of a surface of the third lens facing the image side, and r8 is a curvature radius of a surface facing the image side on the fourth lens.

The image pickup apparatus can satisfy $20 < v1 - v2 < 65$, where v1 is an Abbe number of the first lens, and v2 is an Abbe number of the second lens.

Further, at least one lens of the image pickup lens can comprise a plastic.

The present invention further provides an embodiment which is an image pickup apparatus comprising: a casing comprising a light-shielding material and comprising an aperture where a light flux from a subject enters into; the above image pickup lens housed in the casing, for receiving a light flux passing through the aperture; an image pickup element for receiving a light flux guided by the image pickup lens; a substrate supporting the image pickup element; and a connecting terminal formed on the substrate, for transmitting and receiving electrical signal.

The image pickup apparatus can have a height of less than 10 mm along the optical axis.

The present invention provides an embodiment which is a mobile terminal comprising the above image pickup apparatus.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIGS. 17(a) to 17(c) are diagrams showing aberrations of an image pickup lens in the seventh embodiment;

DESCRIPTION OF THE PREFERRED EMBODIMENT

Figure 1:
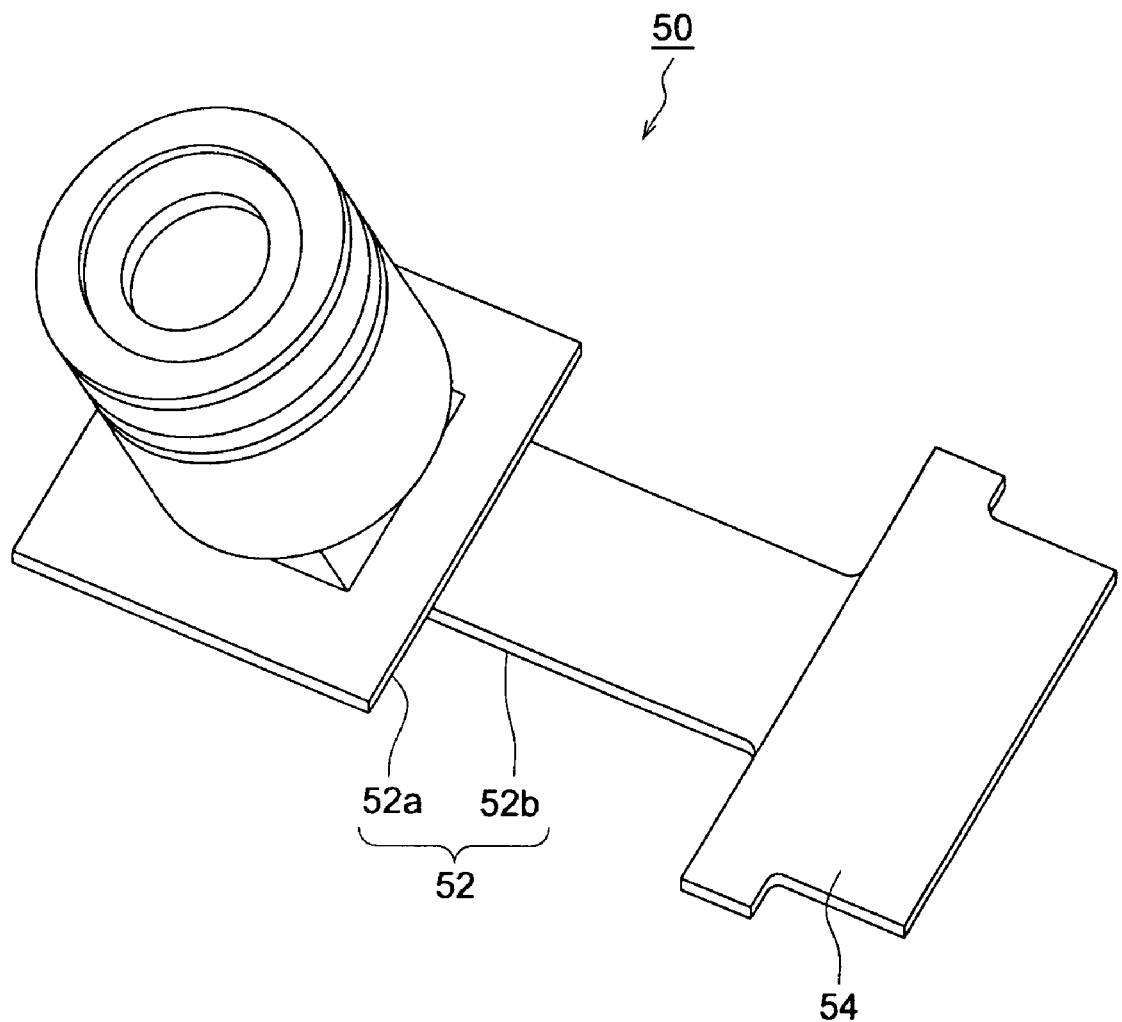
FIG. 1 is a perspective view of an image pickup apparatus in an embodiment of the invention.

An embodiment of the invention will be explained as follows, referring to FIG. 1 and FIG. 2. FIG. 1 shows a perspective view of image pickup unit 50 serving as an image pickup apparatus representing the present embodiment, and FIG. 2 is a sectional view taken on an optical axis of the image pickup lens of image pickup unit 50.

Figure 2:
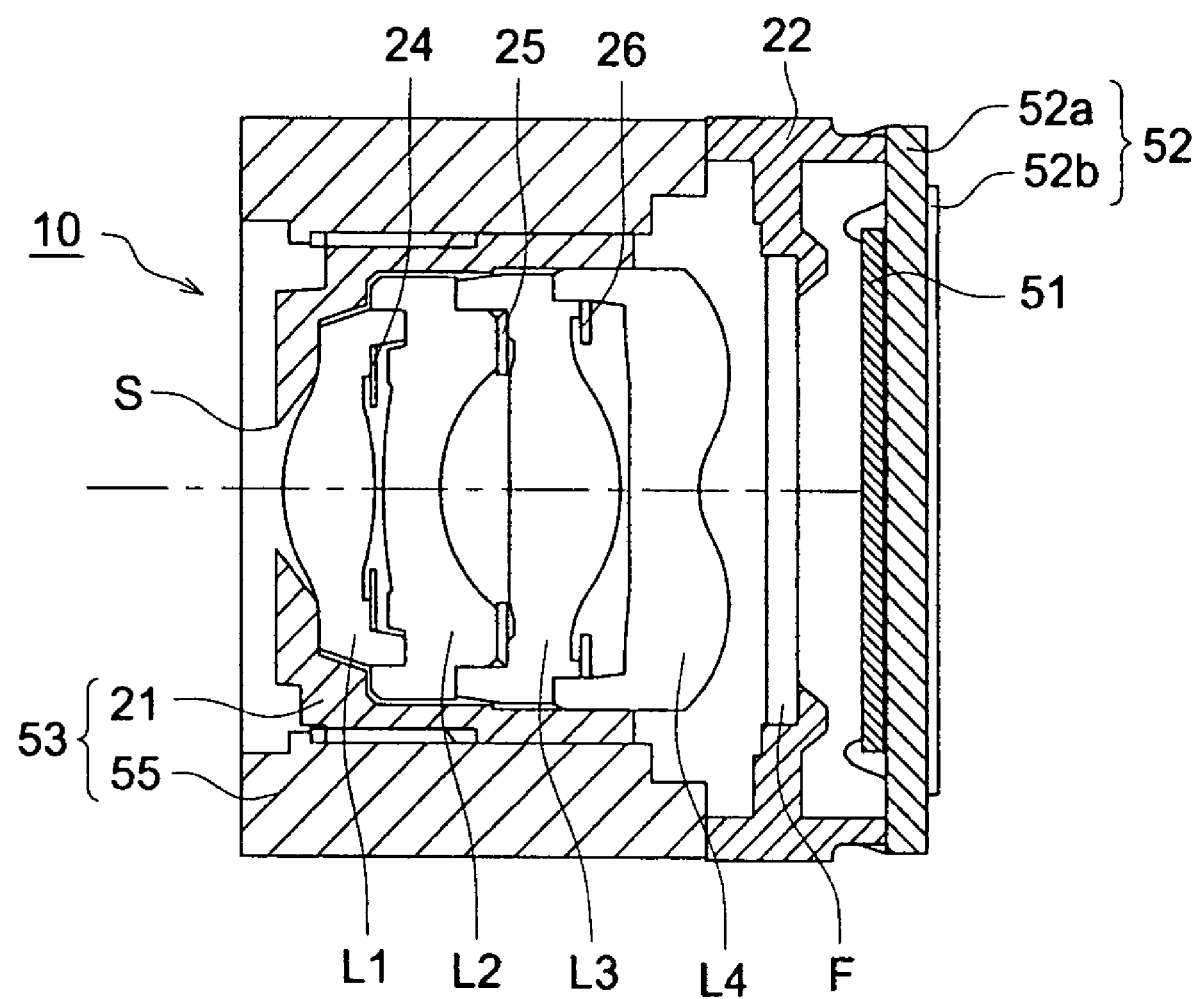
FIG. 2 is a sectional view of an image pickup lens in an embodiment of the invention.

As shown in FIG. 2, the image pickup unit 50 is provided with: casing 53 representing a lens-barrel; CCD type image sensor 51 serving as an image pickup element; image pickup lens 10, and substrate 52, and aforesaid items are integrally formed as one body. The casing 53 is formed with a light-shielding material and includes an opening (an aperture) for an incident light flux coming from a photographic subject side. The image pickup lens 10 forms an image of the photographic subject on the CCD type image sensor 51. The substrate 52 supports the CCD type image sensor 51 and includes external connecting terminal 54 (see FIG. 1) which transmits and receives electrical signal of the image sensor 51. Incidentally, the image pickup element is not limited to the CCD type image sensor, and other ones including CMOS or the like can be used.

The substrate 52 is equipped with supporting flat plate 52a and flexible substrate 52b. The supporting flat plate 52a supports, on its one surface, the image sensor 51 and further supports the casing 53 through holding collar 22 that holds filter F such as an infrared cutoff filter. One end of the flexible substrate 52b is connected to the back surface (surface opposite to image sensor 51) of the supporting flat plate 52a, and the flexible substrate 52b is connected to image sensor 51 through the supporting flat plate 52a. Alternatively, it is also possible to connect the supporting flat plate 52a directly to the external connecting terminal 54, skipping the flexible substrate 52b, and to insert the external connecting terminal into a socket section on the mobile terminal side to connect to a connector portion formed on the socket section.

Next, the casing 53 and the image pickup lens 10 will be explained. The casing 53 is equipped with outer barrel 55 and inner barrel 21. The outer barrel 55 is fixed and held on the supporting flat plate 52a by means of adhesion through the holding collar 22 in a way to surround the image pickup element 51. The inner barrel 21 fixes and holds aperture stop S of image pickup lens 10 described later, first lens L1, second lens L2, third lens L3 and fourth lens L4. Then, the inner barrel 21 is screwed in the inside of the outer barrel 55 and is fixed and held therein after back focus of the image pickup lens 10 is adjusted. Incidentally, the aperture stop S provided in the inner barrel 21 determines F-number of the image pickup lens.

Inside the inner barrel 21, there are housed lenses L1, L2, L3 and L4. On the lenses L1, L2 and L3, there are respectively arranged light-shielding masks 24, 25 and 26. Each of the light-shielding masks 24, 25 and 26 regulates a range of an effective diameter which provides an area from an optical axis to the prescribed range having a function as an image pickup lens. A flange portion for mutually holding a lens is formed on a portion that is outside the effective diameter of each of the lenses L1, L2, L3 and L4. Then, a flange portion of the first lens L1 is fitted into a flange portion of the second lens L2, thereby, the first lens L1 and the second lens L2 are made to agree each other accurately in terms of an optical axis. In the same way, the second lens L2 is fitted into a flange portion of the third lens L3, thereby, the second lens L2 and the third lens L3 are made to agree each other in terms of an optical axis. The third lens L3 is fitted in a flange portion of the fourth lens L4, thereby, the third lens L3 and the fourth lens L4 are made to agree each other in terms of an optical axis. As stated above, the image pickup lens 10 is fixed and held by means of adhesives under the state wherein respective lenses L1, L2, L3 and L4 are made to agree each other in terms of an optical axis, and the first lens L1 is pushed in the optical axis direction against an end portion on photographic subject side of inner barrel 21 and fourth lens L4 is fitted into inner barrel 21.

Figure 3:
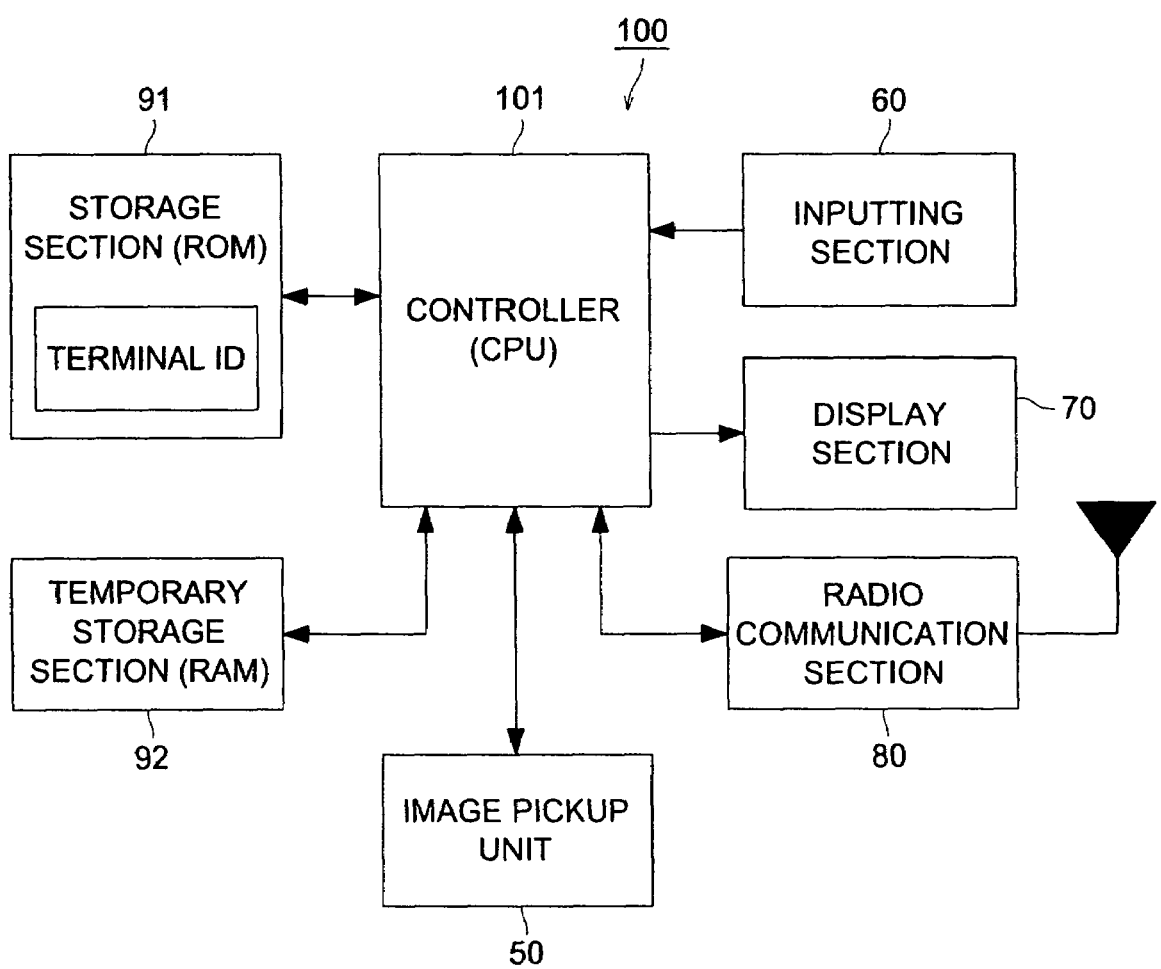
FIG. 3 is a control block diagram of a mobile terminal on which an image pickup apparatus according to the invention is applied.

An illustrative embodiment of how the aforesaid image pickup unit 50 is used will be explained. FIG. 3 is a control block diagram in mobile cell-phone 100 representing a mobile terminal equipped with image pickup unit 50. The mobile cell-phone 100 is equipped with controller (CPU) 101; inputting section 60; display section 70; radio communication section 80; storage section (ROM) 91; and temporary storage section (RAM) 92. The controller (CPU) 101 pulls together and controls various sections, and executes programs corresponding to processing in the respective sections. The inputting section 60 is provided for indicating and inputting information such as telephone numbers by means of keys. The display section 70 displays picked-up images in addition to prescribed data. The radio communication section 80 is provided for realizing communication of various types of information with external servers. The storage section (ROM) 91 stores necessary various data such as system programs of mobile cell-phone 100, various types programs for processing, and terminal IDs. The temporary storage section (RAM) 92 is used as a work area where various types of programs for the processing and various types of data executed by the controller 101, or processed data are temporarily stored, or image pickup data is temporarily stored by the image pickup unit 50. Image signals inputted from the image pickup unit 50 are stored in the temporary storing section 92 through indication of controller 101, or are displayed on the display section 70 through indication of controller 101. Further, the image signals are transmitted to the outside as image information through radio communication section 80.

Next, the structure of the image pickup lens will be explained, referring to FIGS. 4 to 10, 18 and 19.

Figure 4:
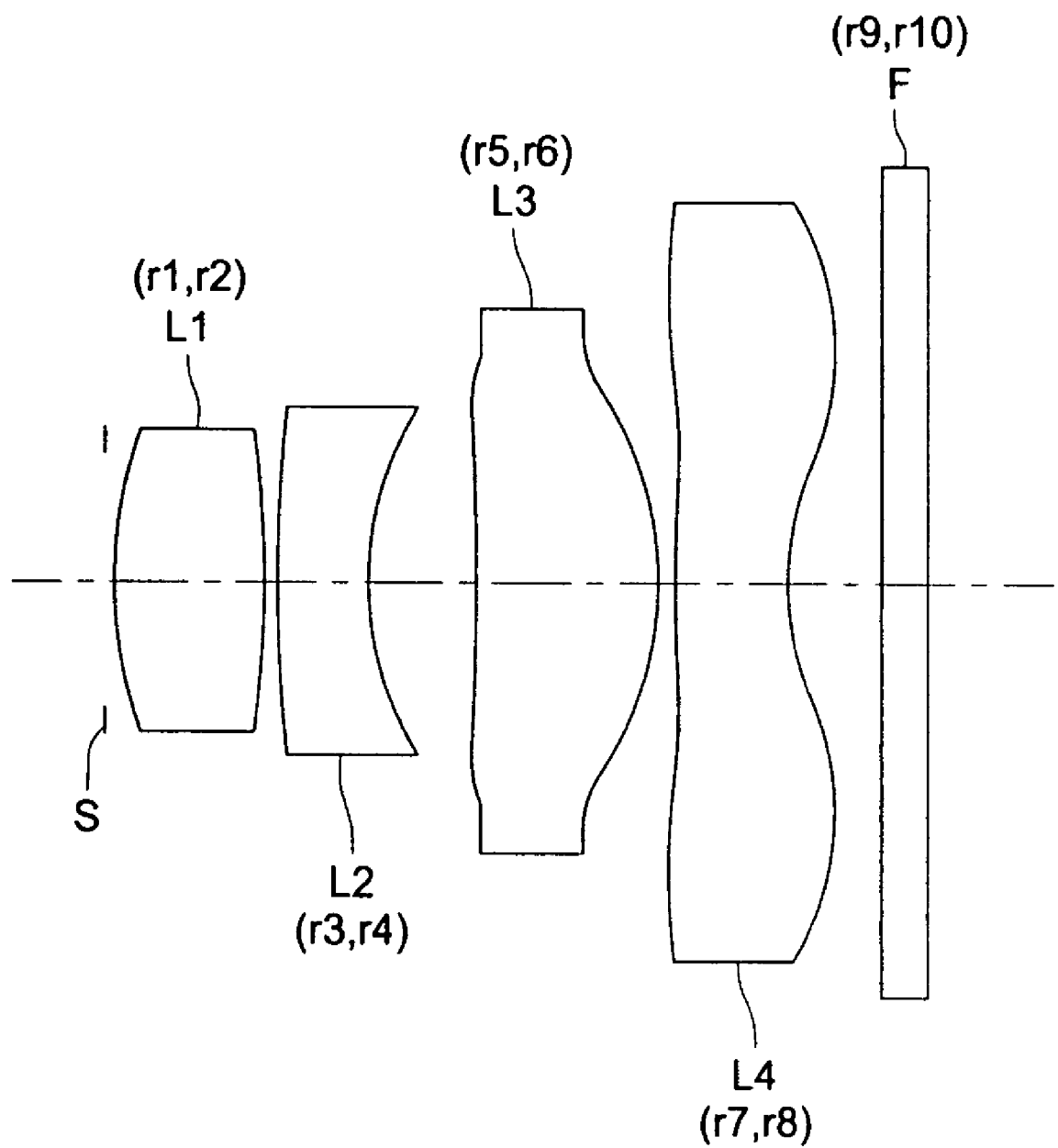
FIG. 4 is a diagram showing the structure of an image pickup lens in the first embodiment.

FIG. 4 shows First Embodiment of image pickup lens 10. The image pickup lens in FIG. 4 is provided, in the order from the photographic subject side (object side), with aperture stop S, the first lens L1 having positive refractive power and having a biconvex shape, the second lens L2 having negative refractive power and having a meniscus shape whose concave surface faces the image side, the third lens L3 having a positive refractive power and having a meniscus shape whose convex surface faces the image side, and the fourth lens L4 having negative refractive power and having a meniscus shape whose concave surface faces the image side. There is positioned parallel flat plate F on the image side of the image pickup lens, which equivalents to a low-pass filter, an IR cutoff filter, a seal glass of a solid-state image pickup element, and a cover glass. Incidentally, it is also assumed that similar parallel flat plate F is arranged on the image side of the image pickup lens even in the succeeding embodiments.

Each of the first lens L1, the third lens L3 and the fourth lens L4 is made of a polyolefin-based plastic material, and its saturated water absorption is 0.01% or less, while, the second lens L2 is made of a polycarbonate-based plastic material, and its saturated water absorption is 0.4%.

Figure 5:
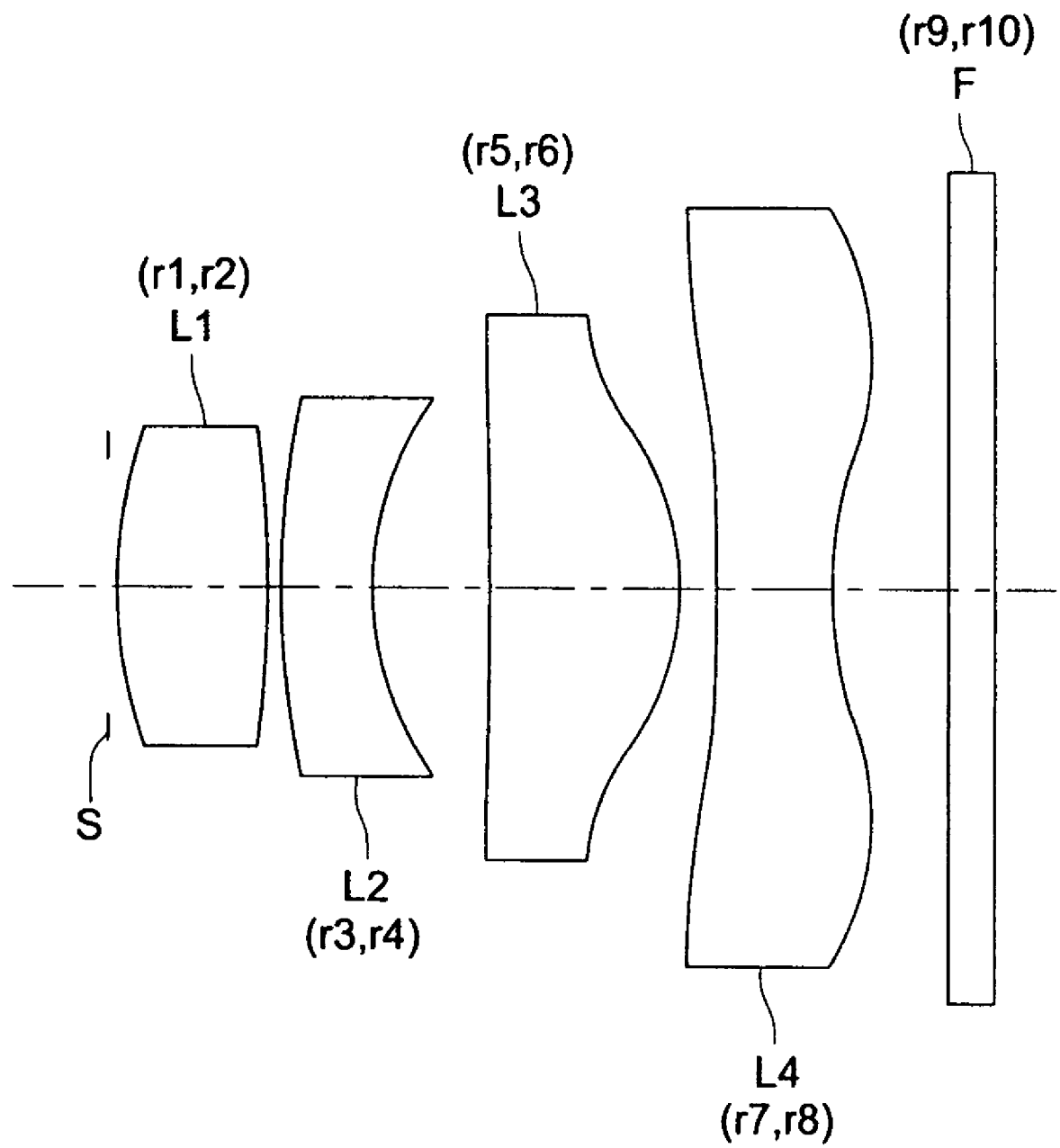
FIG. 5 is a diagram showing the structure of an-image pickup lens in the second embodiment.

FIG. 5 shows the Second Embodiment. The image pickup lens in FIG. 5 is provided with, in the order from the photographic subject side, aperture stop S, the first lens L1 having positive refractive power and having a biconvex shape, the second lens L2 having negative refractive power and having a meniscus shape whose concave surface faces the image side, the third lens L3 having a positive refractive power and having a meniscus shape whose convex surface faces the image side, and the fourth lens L4 having negative refractive power and having a biconcave shape.

The first lens L1 is a glass lens, and the second lens L2 is made of a polycarbonate-based plastic material and its saturated water absorption is 0.4%, while each of the third lens L3 and the fourth lens L4 is made of an olefin-based plastic material and its saturated water absorption is 0.01% or less.

Figure 6:
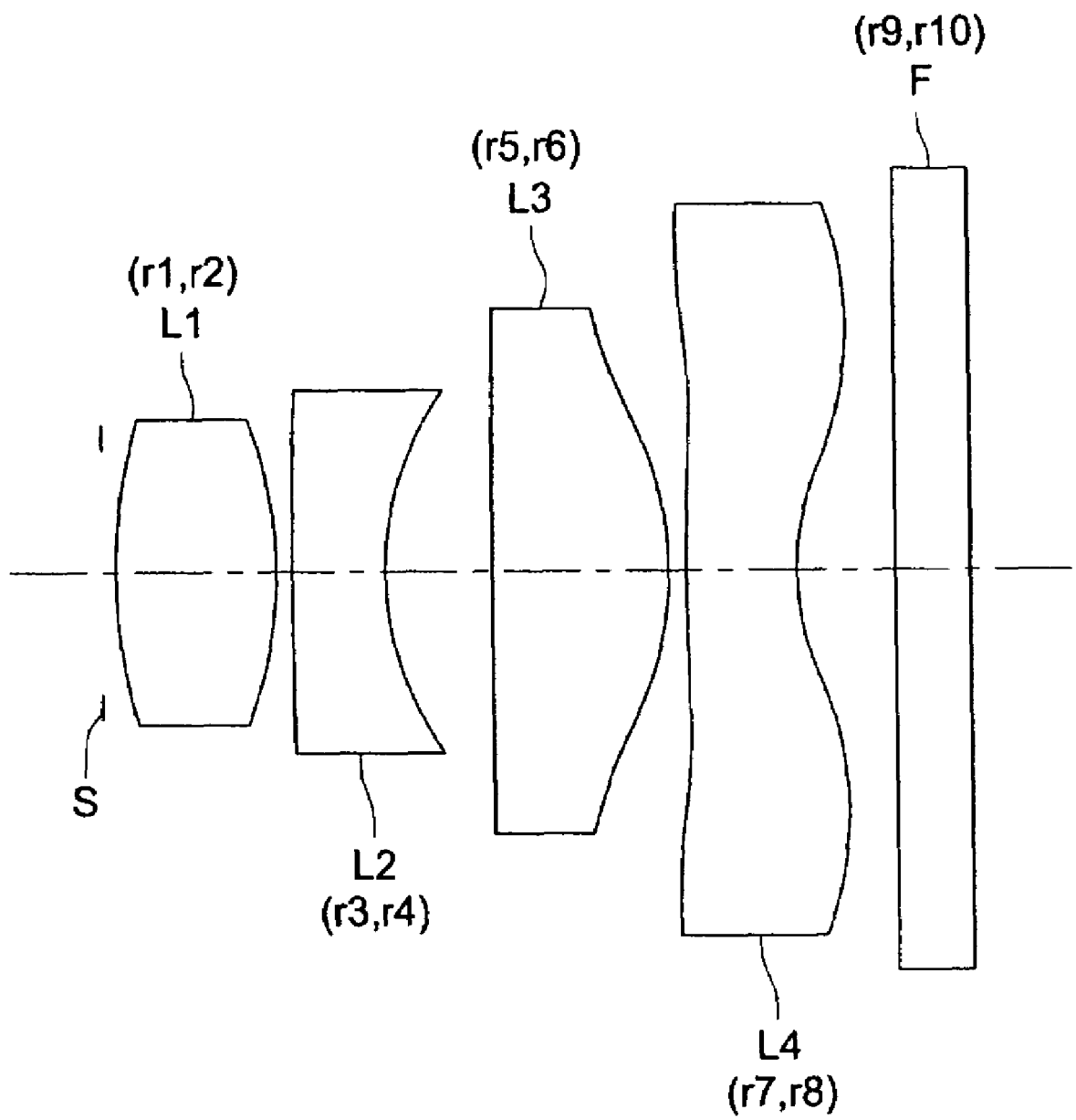
FIG. 6 is a diagram showing the structure of an image pickup lens in the third embodiment.

FIG. 6 shows the Third Embodiment. The image pickup lens in FIG. 6 is provided with, in the order from the photographic subject side, aperture stop S, the first lens L1 having positive refractive power and having a biconvex shape, the second lens L2 having negative refractive power and having a meniscus shape whose concave surface faces the image side, the third lens L3 having positive refractive power and having a meniscus shape whose convex surface faces the image side, and the fourth lens L4 having negative refractive power and having a meniscus shape whose concave surface faces the image side.

Each of the first lens L1, the third lens L3 and the fourth lens L4 is made of a polyolefin-based plastic material, and its saturated water absorption is 0.01% or less, while, the second lens L2 is made of a polycarbonate-based plastic material, and its saturated water absorption is 0.4%.

Figure 7:
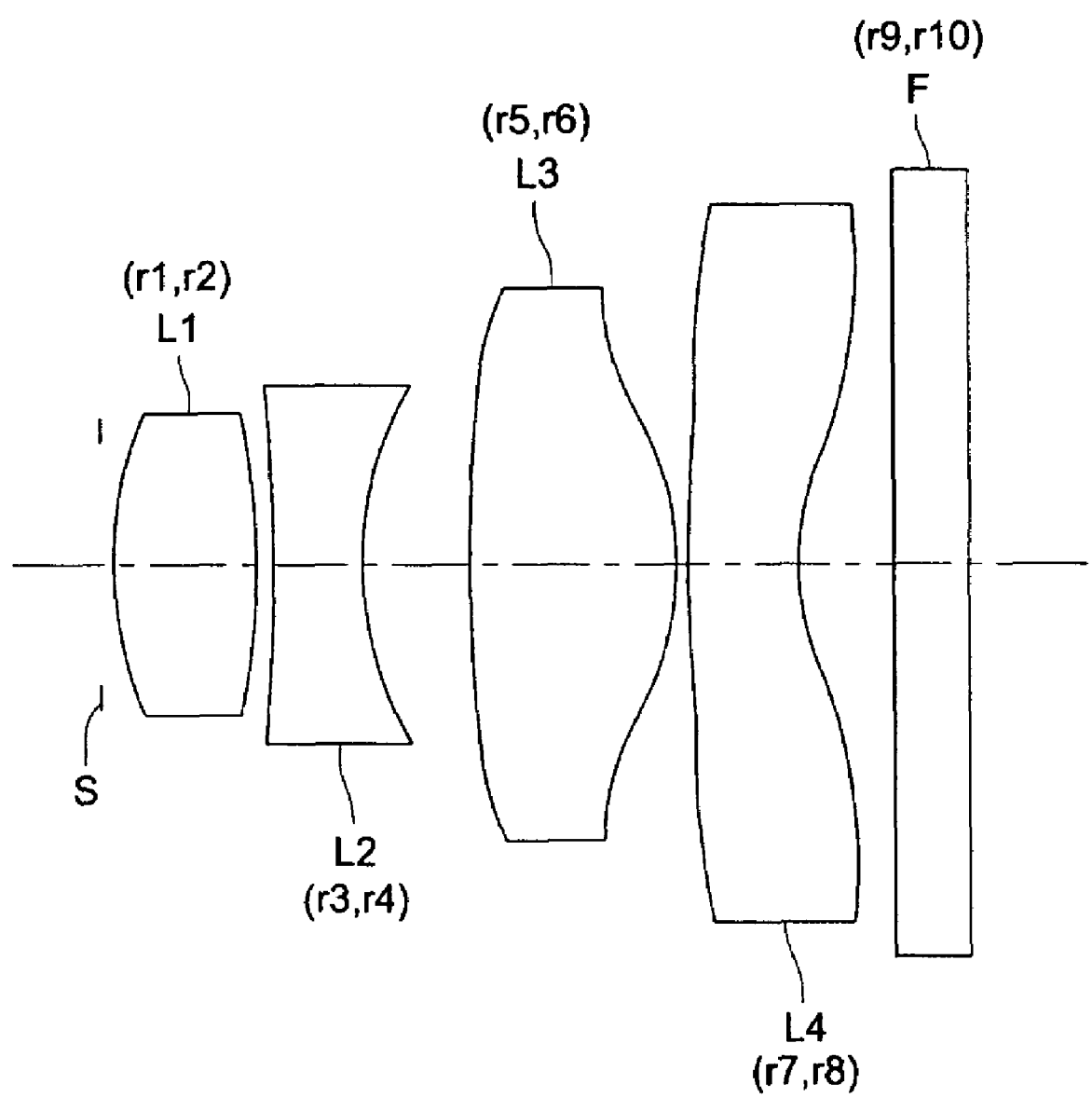
FIG. 7 is a diagram showing the structure of an image pickup lens in the fourth embodiment.

FIG. 7 shows the Fourth Embodiment. The image pickup lens in FIG. 7 is provided with, in the order from the photographic subject side, aperture stop S, the first lens L1 having positive refractive power and having a biconvex shape, the second lens L2 having negative refractive power and having a biconcave shape, the third lens L3 having positive refractive power and having a biconvex shape, and the fourth lens L4 having negative refractive power and having a meniscus shape whose concave surface faces the image side.

Each of the first lens L1 and the fourth lens L4 is made of a polyolefin-based plastic material, and its saturated water absorption is 0.01% or less, while, the second lens L2 is made of a polycarbonate-based plastic material, and its saturated water absorption is 0.4% and the third lens L3 is a glass lens.

Figure 8:
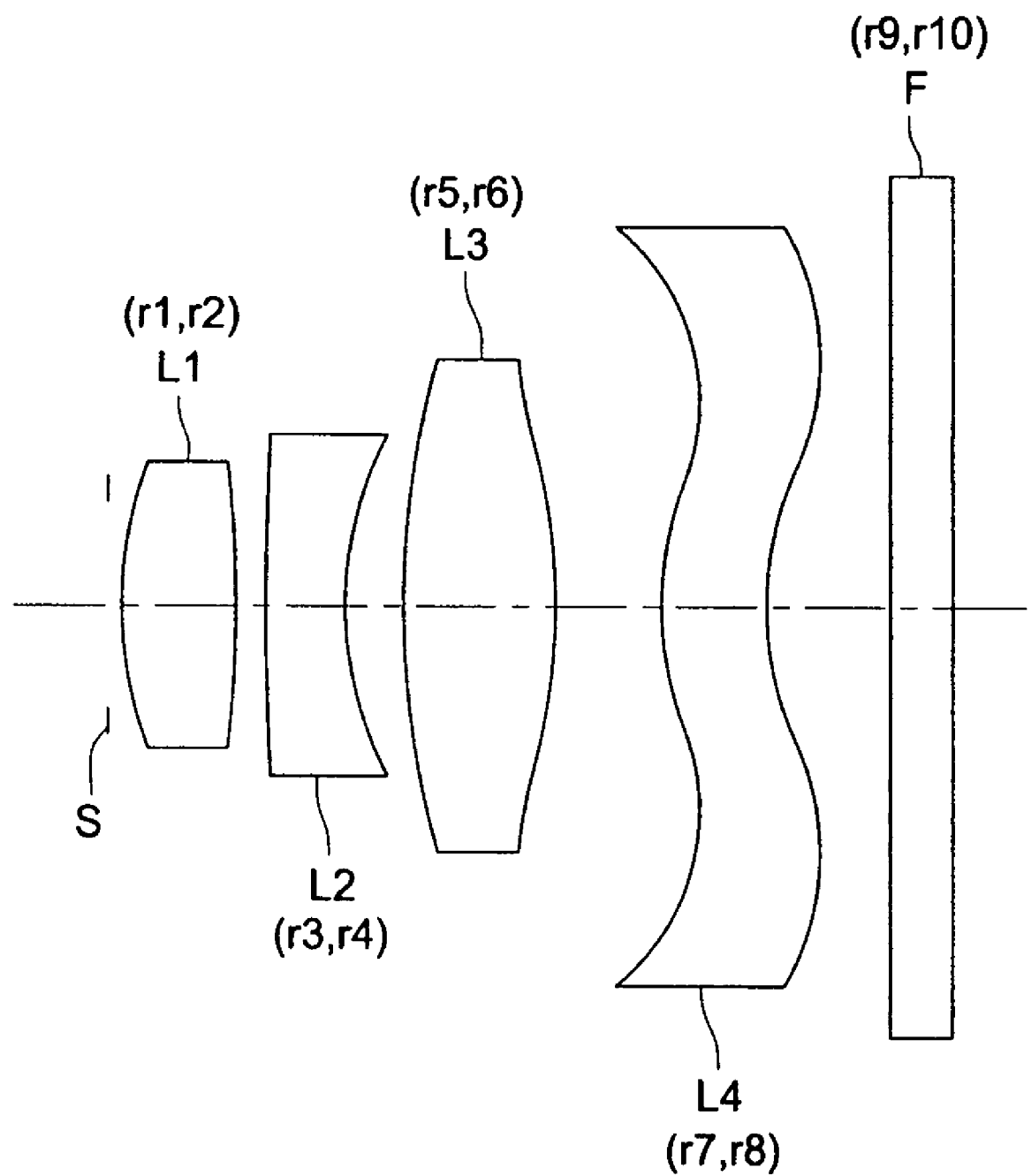
FIG. 8 is a diagram showing the structure of an image pickup lens in the fifth embodiment.

FIG. 8 shows the Fifth Embodiment. The image pickup lens in FIG. 8 is provided with, in the order from the photographic subject side, aperture stop S, the first lens L1 having positive refractive power and having a biconvex shape, the second lens L2 having negative refractive power and having a meniscus shape whose concave surface faces the image side, the third lens L3 having positive refractive power and having a biconvex shape, and the fourth lens L4 having negative refractive power and having a meniscus shape whose concave surface faces the image side.

Each of the first lens L1 and the third lens L3 is made of a polyolefin-based plastic material, and its saturated water absorption is 0.01% or less, while, each of the second lens L2 and the fourth lens L4 is made of a polycarbonate-based plastic material, and its saturated water absorption is 0.4%.

Figure 9:
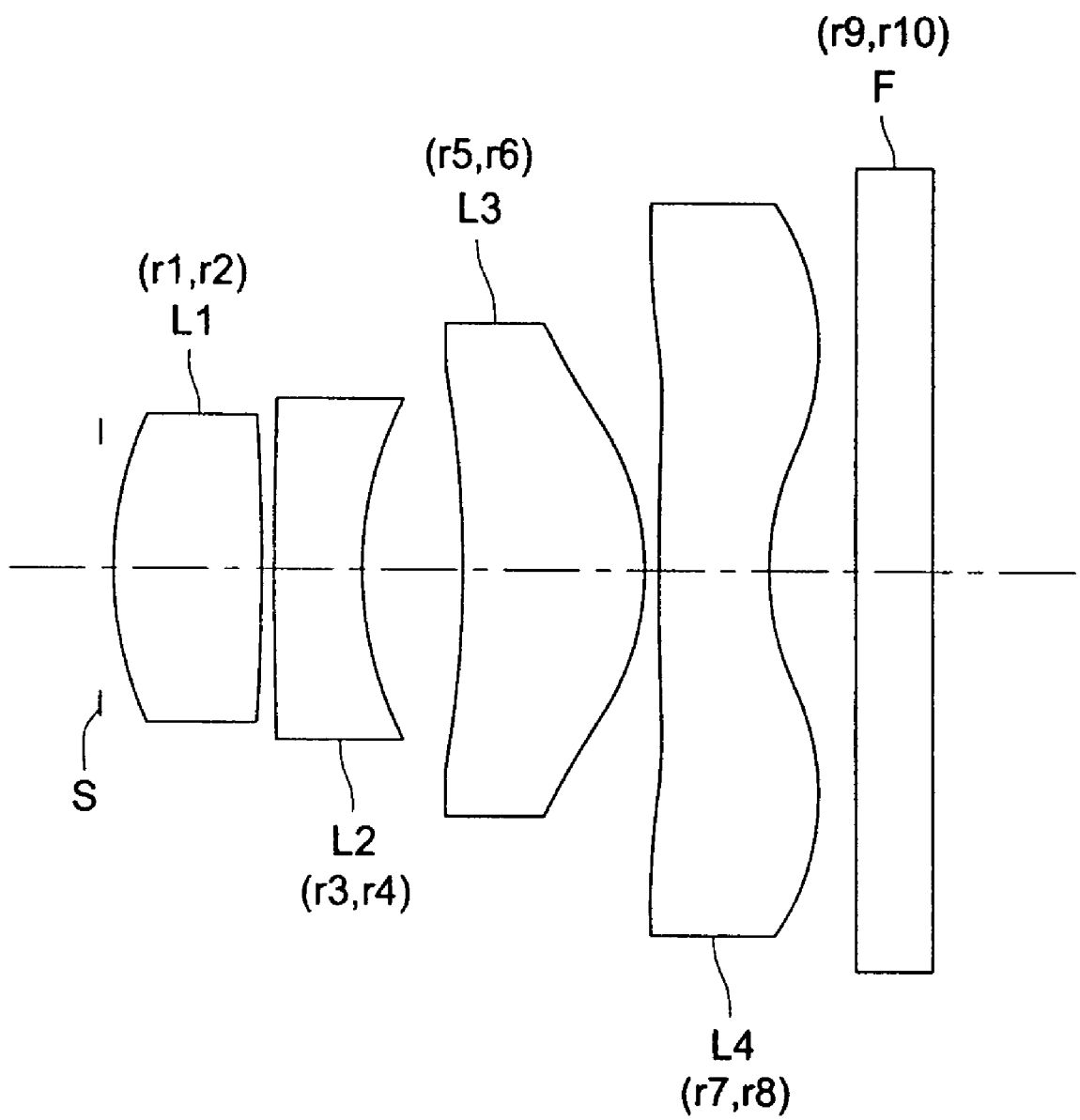
FIG. 9 is a diagram showing the structure of an image pickup lens in the sixth embodiment.

FIG. 9 shows the Sixth Embodiment. The image pickup lens in FIG. 9 is provided with, in the order from the photographic subject side, aperture stop S, the first lens L1 having positive refractive power and having a biconvex shape, the second lens L2 having negative refractive power and having a biconcave shape, the third lens L3 having positive refractive power and having a meniscus shape whose convex surface faces the image side, and the fourth lens L4 having negative refractive power and having a meniscus shape whose concave surface faces the image side.

Each of the first lens L1, the third lens L3 and the fourth lens L4 is made of a polyolefin-based plastic material, an and its saturated water absorption is 0.01% or less, and the second lens L2 is made of a polycarbonate-based plastic material, and its saturated water absorption is 0.4%.

Figure 10:
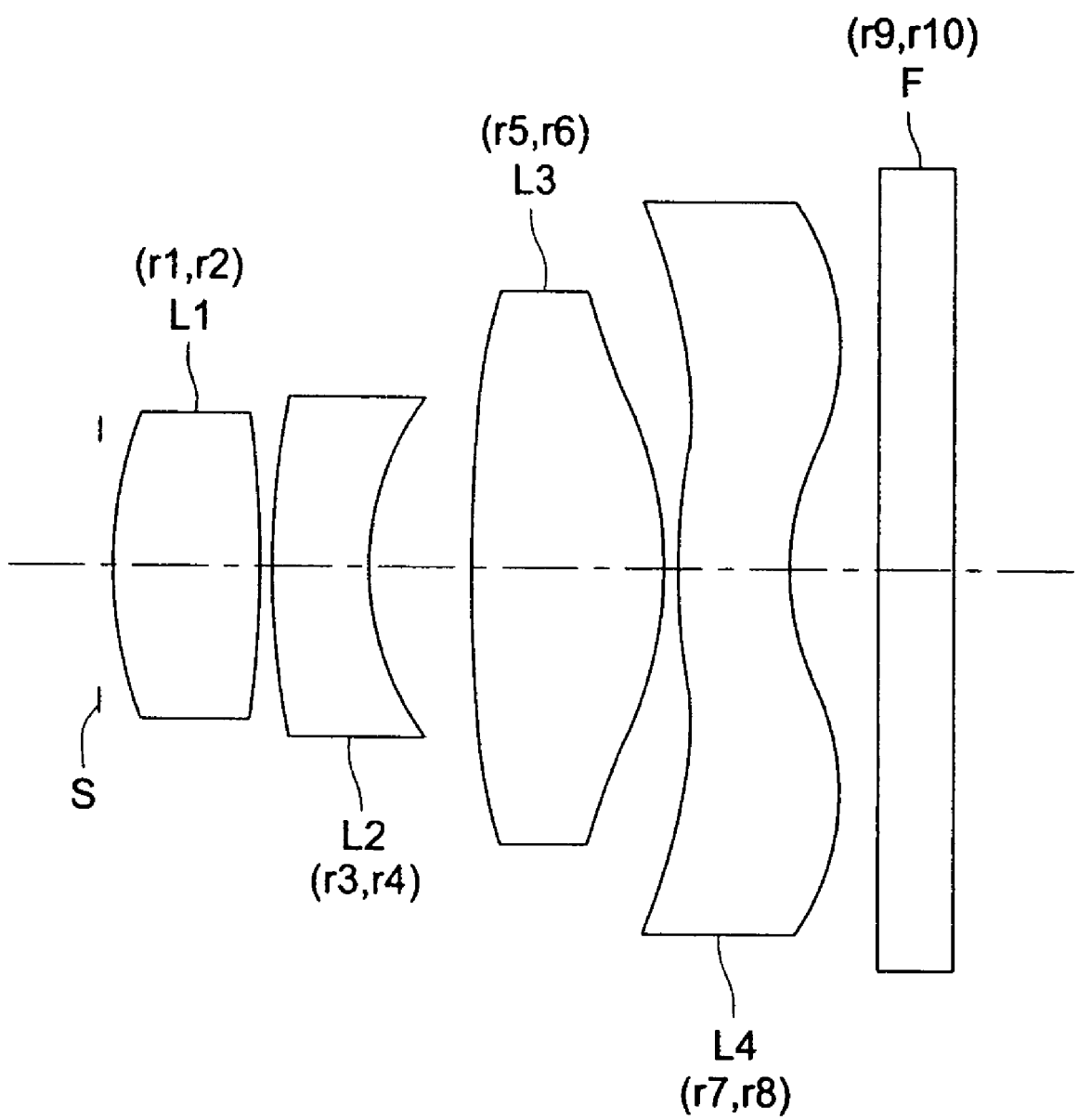
FIG. 10 is a diagram showing the structure of an image pickup lens in the seventh embodiment.

FIG. 10 shows the Seventh Embodiment. The image pickup lens in FIG. 10 is provided with, in the order from the photographic subject side, aperture stop S, the first lens L1 having positive refractive power and having a biconvex shape, the second lens L2 having negative refractive power and having a meniscus shape whose concave surface faces the image side, the third lens L3 having positive refractive power and having a biconvex shape, and the fourth lens L4 having negative refractive power and having a meniscus shape whose concave surface faces the image side.

Each of the first lens L1, the third lens L3 and the fourth lens L4 is made of a polyolefin-based plastic material, an and its saturated water absorption is 0.01% or less, and the second lens L2 is made of a polycarbonate-based plastic material, and its saturated water absorption is 0.4%.

Figure 18:
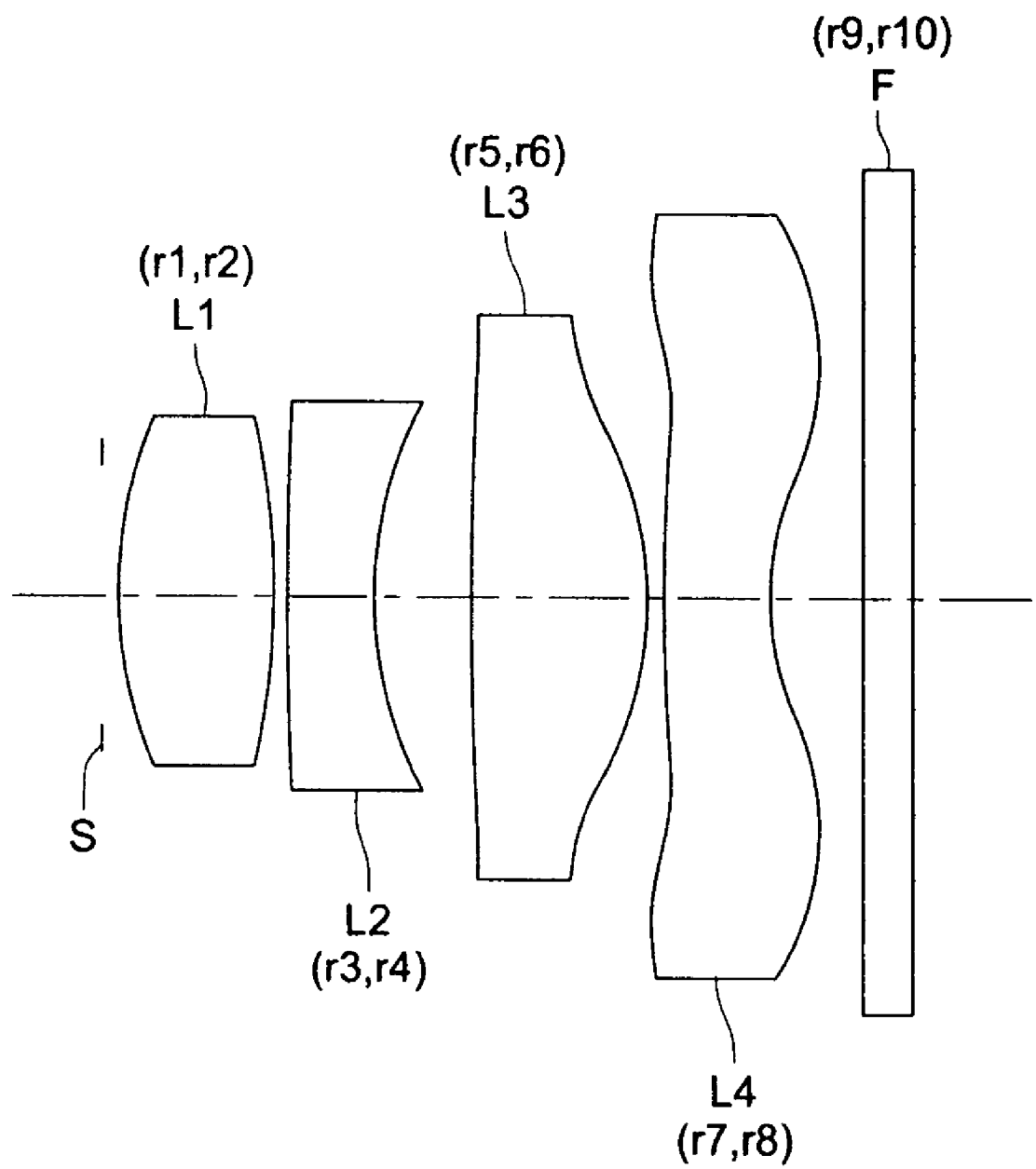
FIG. 18 is a diagram showing the structure of an image pickup lens in the eighth embodiment.

FIG. 18 shows the Eighth Embodiment. The image pickup lens in FIG. 18 is provided with, in the order from the photographic subject side, aperture stop S, the first lens L1 having positive refractive power and having a biconvex shape, the second lens L2 having negative refractive power and having a meniscus shape whose concave surface faces the image side, the third lens L3 having positive refractive power and having a biconvex shape, and the fourth lens L4 having negative refractive power and having a meniscus shape whose concave surface faces the image side.

Each of the first lens L1, the third lens L3 and the fourth lens L4 is made of a polyolefin-based plastic material and its saturated water absorption is 0.01% or less, and the second lens L2 is made of a polyester-based plastic material, and its saturated water absorption is 0.15%.

Figure 19:
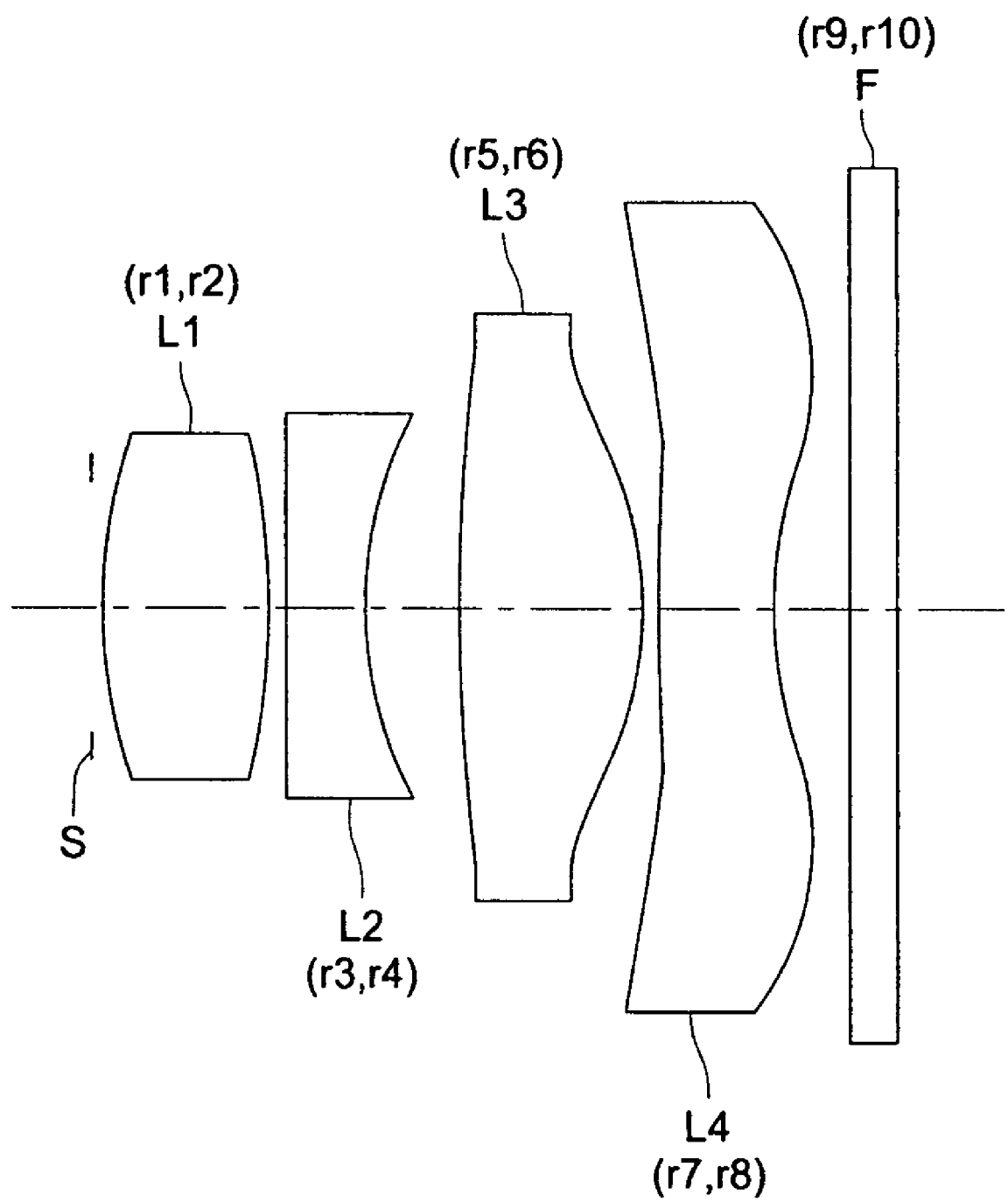
FIG. 19 is a diagram showing the structure of an image pickup lens in the ninth embodiment.

FIG. 19 shows the Ninth Embodiment. The image pickup lens in FIG. 19 is provided with, in the order from the photographic subject side, aperture stop S, the first lens L1 having positive refractive power and having a biconvex shape, the second lens L2 having negative refractive power and having a meniscus shape whose concave surface faces the image side, the third lens L3 having positive refractive power and having a biconvex shape, and the fourth lens L4 having negative refractive power and having a meniscus shape whose concave surface faces the image side.

The first lens L1 is a glass lens, and the second lens L2 is made of a polyester-based plastic material and its saturated water absorption is 0.15%, while each of the third lens L3 and the fourth lens L4 is made of an polyolefin-based plastic material and its saturated water absorption is 0.01% or less.

Each lens in the aforesaid image pickup lenses of the First to Ninth Embodiments has an aspheric surface. In particular, the second to fourth lenses have the following shapes. The second lens L2 has a shape that the surface facing the image side is an aspherical surface such that a farther position on the aspherical surface from an optical axis has a smaller negative refractive power, in other words, when a certain point on the aspheric surface on the image side becomes more distant from the optical axis to the periphery, negative refractive power on that certain point grows weaker. The third lens L3 has a shape that the surface facing the image side is an aspherical surface such that a farther position on the aspherical surface from an optical axis has a smaller positive refractive power. The fourth lens L4 has a shape that the surface facing the image side is an aspherical surface such that a farther position on the aspherical surface from an optical axis has a smaller negative refractive power, and that the aspherical surface have an inflection point on the lens periphery where an off-axis light flux passes through.

In this specification, "the aspherical surface have an inflection point on the periphery" means that the inflection point of the aspherical surface is positioned outside of the optical axis on the lens surface.

The image pickup lens in each embodiment which has been explained is provided with, in the order from the photographic subject side, aperture stop S, the first lens L1 having positive refractive power, the second lens L2 having negative refractive power and including a concave surface facing the image side of the image pickup lens, the third lens L3 having positive refractive power, and fourth lens L4 having negative refractive power and including a concave surface facing the image side of the image pickup lens.

According to the aforesaid structure, there is further arranged the first lens L1, the second lens L2 and the third lens L3 whose composite refractive power becomes positive, and there is further arranged the negative fourth lens L4 including a concave surface facing the image side. Therefore, the structure becomes a so-called telephoto type, thus the image pickup lens can be downsized in terms of the total length. Further, by making two lenses out of four lenses constituting the image pickup lens to be negative lenses, the number of surfaces having divergence function is increased. It allows easy correction of Petzval sum and allows the image pickup lens to secure excellent image forming performance up to the periphery portion of an image area despite a wide angle of view. Further, by arranging the aperture stop to be closest to the photographic subject side (object side), a position of an exit pupil can be made to be more distant from an image pickup surface. Therefore, a principal ray incident angle (an angle formed by a principal ray and an optical axis) of a light flux that forms an image on a peripheral portion of the image pickup surface can be controlled to be small, whereby, the so-called telecentricity can be secured. In addition, even when a mechanical shutter is needed, it is possible to employ the structure in which the shutter is arranged to be closest to the photographic subject side. It provides an image pickup lens whose total length is short.

Further, when the second lens L2 includes a surface configured to be a strongly divergent surface that satisfies the following Expression (1), axial chromatic aberration generated on the first lens L1 having positive refractive power can be corrected properly by the second lens L2.

$$0.2 < r4/f < 0.6 \tag{1}$$

Where, r4 represents a curvature radius of the surface of the second lens L2 facing the image side and f represents a focal length of the total image pickup lens system.

When the lower limit of the Expression (1) is exceeded, a curvature radius of the surface of the second lens L2 facing the image side does not become too small, which does not exert a bad influence on workability. In contrast to this, when the upper limit of the Expression (1) is not exceeded, it is possible to correct chromatic aberration properly while keeping Petzval sum to be small.

It is more preferable to satisfy relationship of Expression (1') in place of Expression (1).

$$0.2 < r4/f \leq 0.52 \tag{1'}$$

It is further more preferable to satisfy relationship of Expression (1") in place of Expression (1).

$$0.3 < r4/f \leq 0.52 \tag{1"}$$

Further, it is preferable that the surface of the second lens L2 facing the image side is an aspherical surface such that a farther position on the aspherical surface from an optical axis has a smaller negative refractive power. Therefore, the light flux that forms an image on the peripheral portion of the image pickup surface is not lifted excessively, and telecentricity of the light flux on the image side of the second lens L2 can be secured easily.

It is preferable that the surface facing image side on the fourth lens L4 is an aspherical surface such that a farther position on the aspherical surface from an optical axis has a smaller negative refractive power, the aspherical surface having an inflection point on a periphery of the fourth lens. Therefore, telecentricity of the light flux on the image side of the fourth lens L4 can be secured easily, and it becomes unnecessary to excessively weaken negative refractive power on the lens peripheral portion on the surface of the second lens L2 facing the image side. Thereby, off-axis aberration can be corrected properly. Incidentally, "the inflection point" is a point on the aspheric surface where a tangential plane at a vertex of the aspheric surface becomes perpendicular to the optical axis, on a curve of a lens sectional form within an effective radius.

Further, it is preferable that the surface facing the image side on the third lens is an aspherical surface such that a farther position on the aspherical surface from an optical axis has a smaller positive refractive power. Thereby, an angle formed by an incident light beam and an outgoing light beam on the surface of the third lens L3 facing the image side, namely, an angle of deviation can be kept to be small, and off-axis aberration of the light flux that forms an image on the peripheral portion of the image pickup surface can be controlled to be small.

It is further preferable to arrange so that relationship of the following expression (2) may be satisfied.

$$0.8 < f12/f < 3 \quad (2)$$

Where, f12 represents a composite focal length of the first lens L1 and the second lens L2.

The Expression (2) establishes proper refractive power for the first lens L1 and the second lens L2. When the lower limit of the Expression (2) is exceeded, positive refractive power of the first lens L1 does not become too great beyond necessity. Thereby, higher-order spherical aberration and coma generated by the first lens L1 can be controlled to be small, without providing excessively large negative refractive power with the second lens L2. In contrast to this, when the upper limit of the Expression (2) is not exceeded, positive refractive power of the first lens L1 and negative refractive power of the second lens L2 can be maintained properly, and a total length of the image pickup lens can be shortened.

It is more preferable to satisfy relationship of Expression (2') in place of Expression (2).

$$1.2 < f12/f < 3 \quad (2')$$

It is further more preferable to arrange to satisfy relationship of Expression (2") in place of Expression 2.

$$1.4 < f12/f < 2.9 \quad (2'')$$

Further, it is possible to arrange to satisfy relationship of the following Expression (3).

$$-1.5 < r8/r6 < -0.2 \quad (3)$$

Where, r6 represents a curvature radius of the surface of the third lens L3 facing the image side and r8 represents a curvature radius of the surface of the fourth lens L4 facing the image side.

The Expression (3) indicates conditions for correcting aberration of field curvature of the total image pickup lens system. When the lower limit of the Expression (3) is exceeded, refractive power of a convex surface of the third lens L3 facing the image side does not become too high, which prevents the image field from curving in the under direction excessively, and further, a curvature radius on the surface of the third lens L3 facing the image side is not too small, and workability is not deteriorated. In contrast to this, when the upper limit of the Expression (3) is not exceeded, refractive power of a concave surface of the fourth lens L4 facing the image side does not become too high, which prevents the image field from curving excessively in the over direction, and further, a curvature radius on the surface of the fourth lens L4 facing the image side is not too small, and workability is not deteriorated.

It is more preferable to satisfy relationship of Expression (3') in place of Expression (3).

$$-1.3 < r8/r6 < -0.5 \quad (3')$$

It is further more preferable to satisfy relationship of Expression (3") in place of Expression (3).

$$-1.2 < r8/r6 < -0.5 \quad (3'')$$

Further, it is possible to satisfy relationship of the following Expression (4).

$$20 < v1 - v2 < 65 \quad (4)$$

Where, v1 represents Abbe number of the first lens L1 and v2 represents Abbe number of the second lens L2.

The Expression (4) indicates conditions for correcting chromatic aberration of the total image pickup lens system properly. When the lower limit of the Expression (4) is exceeded, axial chromatic aberration and magnification chromatic aberration can be corrected with a balanced manner. In contrast to this, when the upper limit of the Expression (4) is not exceeded, easily-available materials can be used for constituting.

It is more preferable to satisfy relationship of Expression (4') in place of Expression (4).

$$25 < v1 - v2 < 65 \quad (4')$$

It is further more preferable to arrange to satisfy relationship of Expression (4") in place of Expression (4).

$$25 < v1 - v2 < 44 \quad (4'')$$

Further, it is preferable that at least one piece of lens in an image pickup lens is made of plastic material. The total system of the image pickup lens for the image pickup element having a small-sized image pickup surface is required to have a focal length shortened proportionally to the length of the diagonal line on the image pickup surface. It makes a curvature radius and an outer diameter of each lens small. Therefore, processing is difficult for a glass lens manufactured through grinding processing. Further, though there is provided a glass molding method for manufacturing a lens with a small diameter, a temperature for pressing in the case of mold pressing needs to be established to be high for the glass generally having a high transition point (Tg). Therefore, it easily damages a molding die. As a result, a frequency of replacement of molding dies and frequency of maintenances are increased, resulting in cost increase. Therefore, by using a plastic lens manufactured through injection molding for at least one piece of lens in an image pickup lens, it is possible to conduct mass production and to easily provide an aspheric surface even for the lens with a small curvature radius and a small outer diameter, which is advantageous also for aberration correction. In the meantime, "made of a plastic material" and "comprise a plastic material" includes an occasion wherein coating processing is conducted on the surface of a base member, which is formed of a plastic material, for the purpose of antireflection and surface hardness improvement.

Further, saturated water absorption of a plastic lens is greater compared with that of a glass lens. Therefore, if there is a sudden humidity change, uneven distribution of moisture absorption is generated transiently, resulting in a tendency that refractive index is not uniform and excellent image forming capability cannot be obtained. Thus, it is preferable to use plastic materials having saturated water absorption of 0.7% or less, for controlling performance deterioration caused by humidity changes.

Since a plastic lens has a great change in refractive index caused by temperature changes, it has a problem that an image point position of the total image pickup lens system is fluctuated when ambient temperatures are changed. Under the aforesaid background, it is possible to reduce fluctuations of image point positions, by making the first lens L1 having positive refractive power to be a lens formed with glass material (for example, a glass mold lens) as shown in the second embodiment, by making the second lens L2, third lens L3 and fourth lens L4 to be a plastic lens and by creating refractive power distribution that cancels image point position fluctuations in the case of temperature changes for the second lens L2, the third lens L3 and the fourth lens L4. The same effect as in the foregoing can be obtained even in the occasion where the third lens L3 having positive refractive power is made of glass material, and other lenses are made to be plastic lenses, as shown in Fourth Embodiment. Incidentally, when using a glass mold lens, it is preferable to use glass material having glass transition point (Tg) of 400° C. or less, for preventing molding dies from consumption as much as possible.

When the image pickup lens uses plastic lenses, it is preferable that one piece of lens out of the first lens L1 having positive refractive power and the third lens L3, or all of the plastic lenses (L1 to L4) are formed by using a plastic material in which inorganic particles such as niobium oxide ($Nb_2O_5$) are dispersed. Due to this structure, fluctuation of the image point position caused with temperature change of the total image pickup lens system can be controlled in small.

In the detailed explanation, when inorganic microparticles are mixed in general transparent plastic material, light scattering is caused and transmittance is lowered. Thereby, the above plastic material has been difficult to be used as an optical material. However, the scattering can be prevented substantially, by reducing a size of the microparticles to be smaller than a wavelength of a transmitting light flux. A plastic material has a decreased refractive index, when the temperature rises, but an inorganic microparticle has an increased refractive index when the temperature rises. It is therefore possible that a refractive index may hardly be changed, by utilizing the aforesaid temperature-dependencies of the plastic material and the inorganic microparticles to cancel them out each other. Specifically, a plastic material with a refractive index having an extremely low temperature-dependency is obtained, by dispersing inorganic microparticles with the maximum diameter of 20 nanometers or less into a plastic material representing a base material. For example, it is possible to reduce a change of a refractive index caused by temperature changes, by dispersing microparticles of niobium oxide ($Nb_2O_5$) into acrylic resin (PMMA resin).

When A represents a change of a refractive index caused by temperature changes, the change of a refractive index caused by temperature changes A is represented by Expression 7 by differentiating refractive index n with temperature t based on Lorentz-Lorenz's formula;

$$A = \frac{(n^2+2)(n^2-1)}{6n}\left\{(-3\alpha) + \frac{1}{[R]}\frac{\partial[R]}{\partial t}\right\} \quad (7)$$

Where, α represents the coefficient of linear expansion and [R] represents molecular refraction. In the case of plastic material, contribution of the second term in Expression 7 is small in general, compared with the first term of Expression 7, and it is substantially negligible. For example, in the case of PMMA resin, coefficient of linear expansion α is $7\times10^{-5}$, and when it is substituted in the aforesaid expression, $A=-1.2\times10^{-4}/°$ C. holds, which almost agrees with an actual measurement. Specifically, it is preferable to control change of a refractive index caused by temperature changes A which has been about $-1.2\times10^{-4}/°$ C. to be less than $8\times10^{-5}/°$ C. in terms of an absolute value. It is preferable to control it to be less than $6\times10^{-5}/°$ C. in terms of an absolute value.

Table 1 shows changes of a refractive index caused by temperature changes A of plastic materials which can be applied in embodiments according to the invention.

TABLE 1

| Plastic materials | A |
|---|---|
| Polyolefin-based plastic material | $-11\times10^{-5}$ |
| Polycarbonate-based plastic material | $-14\times10^{-5}$ |
| Polyester-based plastic material | $-13\times10^{-5}$ |

Now, there will be provided a difference in fluctuations in image point positions caused by temperature changes, which is namely a difference of an amount of changes of the back focus, between an example employing a plastic lens in which inorganic microparticles are dispersed, and an example not employing a plastic lens in which inorganic microparticles are dispersed, in the First Embodiment. First, in the example which does not employ the plastic lens in which inorganic microparticles are dispersed, an amount of changes of the back focus in an occasion where a temperature raises by +30° C. from a normal temperature (20° C.) is +0.025 mm, while, an amount of changes of the back focus in an occasion where a temperature is lowered by 30° C. from the normal temperature is −0.024 mm. Next, Table 2 shows changes of refractive index nd caused by temperature change in an example employing a plastic material in which inorganic microparticles are dispersed for the first lens L1 and the third lens L3 and employing a plastic material containing no inorganic microparticles for the second lens L2 and the fourth lens L4.

TABLE 2

| | A | Refractive index at normal temperature | Refractive index at normal temperature plus 30° C. | Refractive index at normal temperature minus 30° C. |
|---|---|---|---|---|
| First lens | $-8\times10^{-5}$ | 1.5318 | 1.5294 | 1.5342 |
| | $-6\times10^{-5}$ | | 1.5300 | 1.5336 |
| Second lens | $-14\times10^{-5}$ | 1.5830 | 1.5788 | 1.5872 |
| Third lens | $-8\times10^{-5}$ | 1.5318 | 1.5294 | 1.5342 |
| | $-6\times10^{-5}$ | | 1.5300 | 1.5336 |
| Fourth lens | $-11\times10^{-5}$ | 1.5318 | 1.5285 | 1.5351 |

According to Table 2, amounts of changes of the back focus (ΔfB) caused when the temperature is raised by +30° C. from a normal temperature (20° C.) are +0.010 mm and +0.001 mm in an example that each of the first lens L1 and the third lens L3 shows $A=-8\times10^{-5}/°$ C. and an example that each of the first lens L1 and the third lens L3 shows $A=-6\times10^{-5}/°$ C., respectively. While, amounts of changes of the back focus caused when the temperature is lowered by 30° C. from the normal temperature are −0.010 mm and −0.001 mm in an example that each of the first lens L1 and the third lens L3 shows A=−8×10$^{-5}$/° C. and an example that each of the first lens L1 and the third lens L3 shows A=−6×10$^{-5}$/° C., respectively.

Compared with the example which uses the plastic lens containing no inorganic microparticles at all, in the example that employs the plastic material in which inorganic grains are dispersed for the first lens L1 and the third lens L3 and the material provides A=−6×10$^{-5}$/° C., an amount of changes of the back focus caused by temperature changes is controlled to be extremely small, which is shown by Table 2. Further, each of the first lens L1 to the fourth lens L4 may also use plastic material in which inorganic microparticles are dispersed and the microparticles have a different value of refractive index change A caused by temperature change. In that case, it is also possible that a fluctuation in the image point position of the total image pickup lens caused by temperature change is not generated at all, by selecting an optimum value of A with considering magnifications of contributions from respective lenses for the fluctuation in the image point position caused by temperature change.

Further, in Fourth Embodiment, the third lens L3 having positive refractive power is a glass mold lens, the first lens L1 having positive refractive power, the second lens L2 having negative refractive power and the fourth lens L4 having negative refractive power are plastic lenses, and refractive powers are distributed to the first lens L1, the second lens L2 and the fourth lens L4 so as to cancel the fluctuation in the image point position caused by temperature changes each other to a certain extent. Thereby, an amount of changes of back focus caused by temperature changes is made to be small. An amount of changes of the back focus caused when a temperature is raised by +30° C. from a normal temperature (20° C.) and an amount of changes of the back focus caused when a temperature is lowered by 30° C. from a normal temperature are +0.006 mm and −0.006 mm, respectively. Owing to this, an amount of changes of back focus caused by temperature changes grows to be extremely small, and the fluctuation in the image point positional can be controlled.

Next, by utilizing the aforesaid image pickup lens 10 for an image pickup apparatus provided with the substrate 52 which supports the image pickup element 51 and includes thereon the connecting terminal for transmitting and receiving electrical signals, it provides an image pickup apparatus with smaller size and higher performance.

In addition, when the image pickup apparatus has a height of less than 10 mm along the optical axis, an image pickup apparatus has smaller size and higher performance. Incidentally, under the condition that the casing 53 is provided on the front face of the substrate 52 and an electronic part is mounted on the rear surface of substrate 52, the length of an image pickup apparatus in the optical axis direction is a distance from the forefront of casing 53 representing the photographic subject side to the forefront of an electronic part protruding from the rear surface of substrate 52.

To obtain a small-sized image pickup lens in this case, it is preferable to satisfy the following Expression (5).

$$L/2Y<1.5 \quad (5)$$

Where, L represents a distance along the optical axis between a lens surface arranged closest to the photographic subject in the total image pickup lens system, and a focal point on the image side, and 2Y represents a length of a diagonal line on the image-pickup surface (a length of a diagonal line of an effective pixel area in rectangular shape of an image pickup element). By satisfying a range of Expression (5), the total length of the image pickup lens can be shortened, and an outer diameter of the lens can be make small synergistically, resulting in downsizing and weight reduction of the total image pickup apparatus. In the mean time, "the focal point on the image side" means an image point formed when a parallel ray enters into the image pickup lens parallel to the optical axis. In this case, when there is provided a parallel flat plate such as an optical low-pass filter, an IR cutoff filter, or a seal glass of an image pickup element package, between the surface of the image pickup lens closest to the image side and a focal point position on the image side, a value of the aforesaid L is assumed to be calculated with using a distance converted in to the air for the area of the parallel flat plate.

It is more preferable to satisfy relationship of Expression (5') in place of Expression (5).

$$L/2Y<1.3 \quad (5')$$

When the image pickup apparatus according to the invention is used for a mobile terminal, it is possible to obtain a mobile terminal which is furthermore small in size and is high performance.

EXAMPLES

The structure of the image pickup lens of the invention will be explained more specifically, referring to construction data and aberration diagrams. Example 1 to Example 9 which will be explained as examples here correspond respectively to the aforesaid First Embodiment to Ninth Embodiment. FIGS. 4 to 10, 18 and 19 are lens structure diagrams respectively indicating the First to Ninth Embodiments and respectively show lens structures of corresponding Examples 1 to 9.

In the construction data in Tables 3 to 20, optical surfaces are numbered from the object side; curvature radius of each of the optical surfaces is expressed by r; and each axial distance from each optical surface to the neighboring optical surface is expressed by d, whose values appear in respective columns from the top of the tables, in the order from the objective side of the image pickup optical lens. In the tables, each refractive index is represented by N, each Abbe number is represented by ν, whose values appear in respective columns from the top of the tables, in the order from the objective side of the image pickup optical lens. The refractive index and Abbe number are for d line. Refractive index and Abbe number both for air are omitted. In these constructions, an image pickup element is arranged behind the last surface. Each table shows focal length of the total system (f), back focus (fB), F-number (FNO) and a length of diagonal line on an image pickup surface (2Y) together with the above data. A unit for each of the focal length, the back focus, the length of diagonal line on the image pickup surface, a curvature radius and the axial distance is a millimeter.

An aspheric surface is defined by the following Expression (6).

$$X=(h^2/r)/[1+\{1-(1+K)h^2/r^2\}^{1/2}]+\Sigma A_i h^i \quad (6)$$

Where, h represents a height in the direction perpendicular to the optical axis, X represents an amount of displacement in the optical axis direction at the position of height h (the origin of the displacement is the surface vertex of the surface), r represents a paraxial curvature-radius, K represents a conic constant and $A_i$ represents i$^{th}$ order aspheric surface coefficient. Data concerning an aspheric surface are shown in Tables 4, 6, 8, 10, 12, 14, 16, 18, and 20. Character E given to data indicates an exponent of a corresponding numerical value. For example, 1.0E-02 means $1.0\times10^{-2}$.

Figures 11A, 11B, 11C:
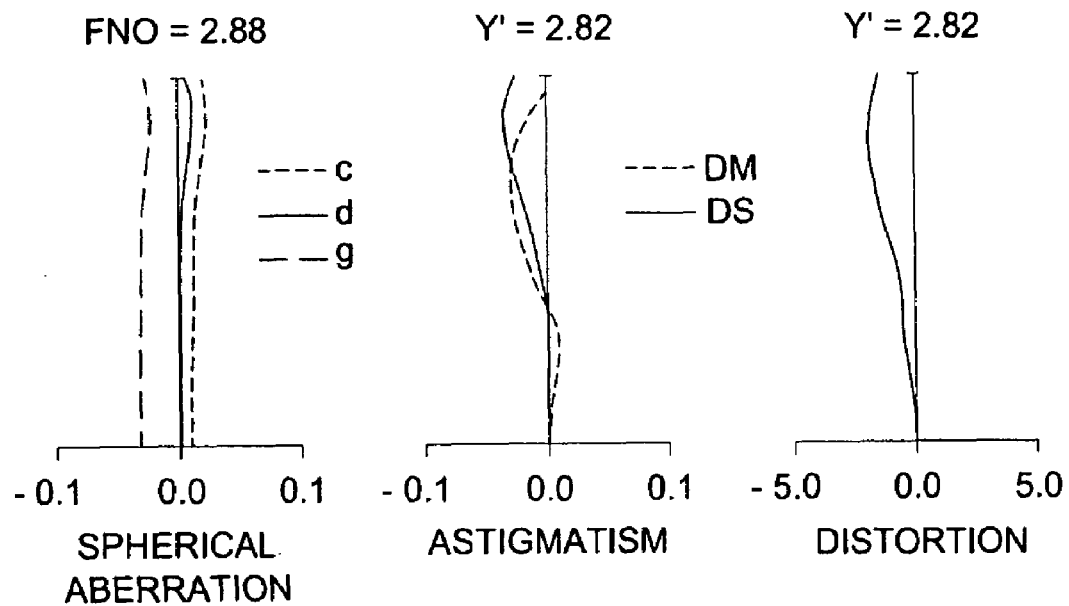
FIGS. 11(a) to 11(c) are diagrams showing aberrations of an image pickup lens in the first embodiment.
Figures 12A, 12B, 12C:
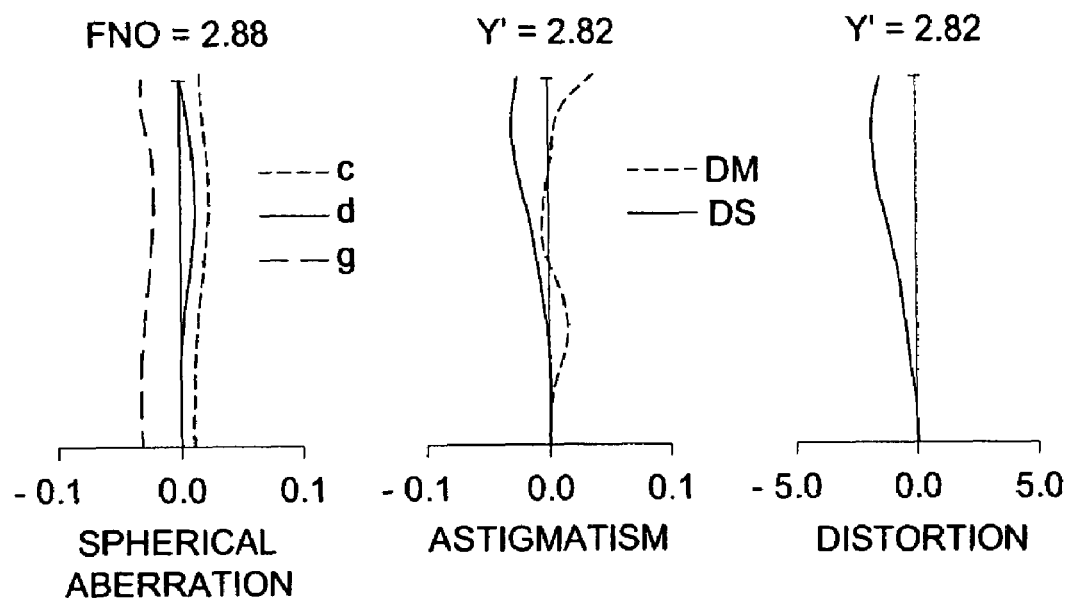
FIGS. 12(a) to 12(c) are diagrams showing aberrations of an image pickup lens in the second embodiment.
Figures 13A, 13B, 13C:
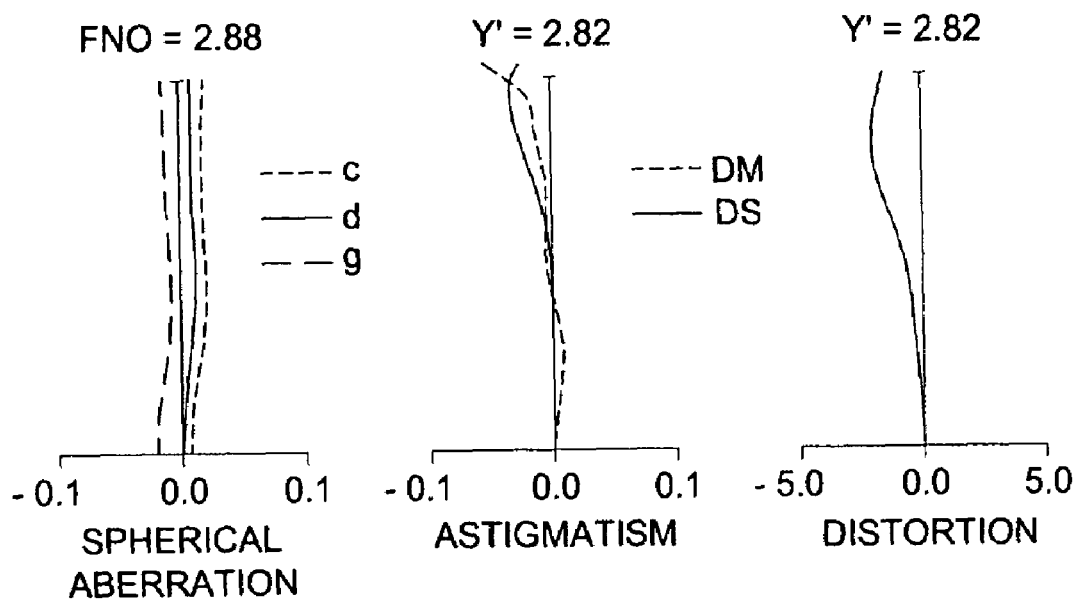
FIGS. 13(a) to 13(c) are diagrams showing aberrations of an image pickup lens in the third embodiment.
Figures 14A, 14B, 14C:
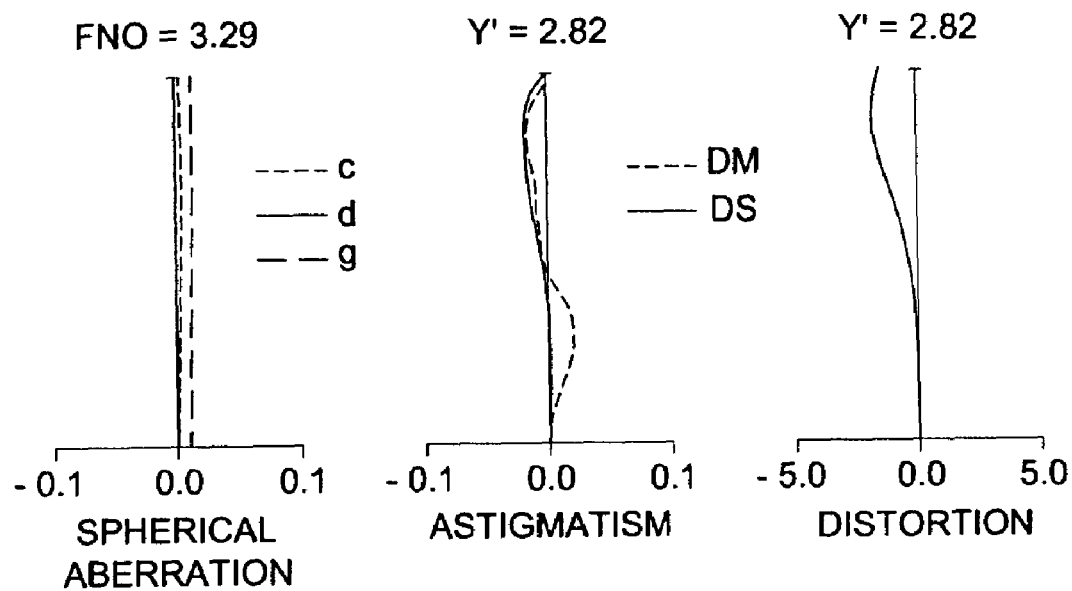
FIGS. 14(a) to 14(c) are diagrams showing aberrations of an image pickup lens in the fourth embodiment.
Figures 15A, 15B, 15C:
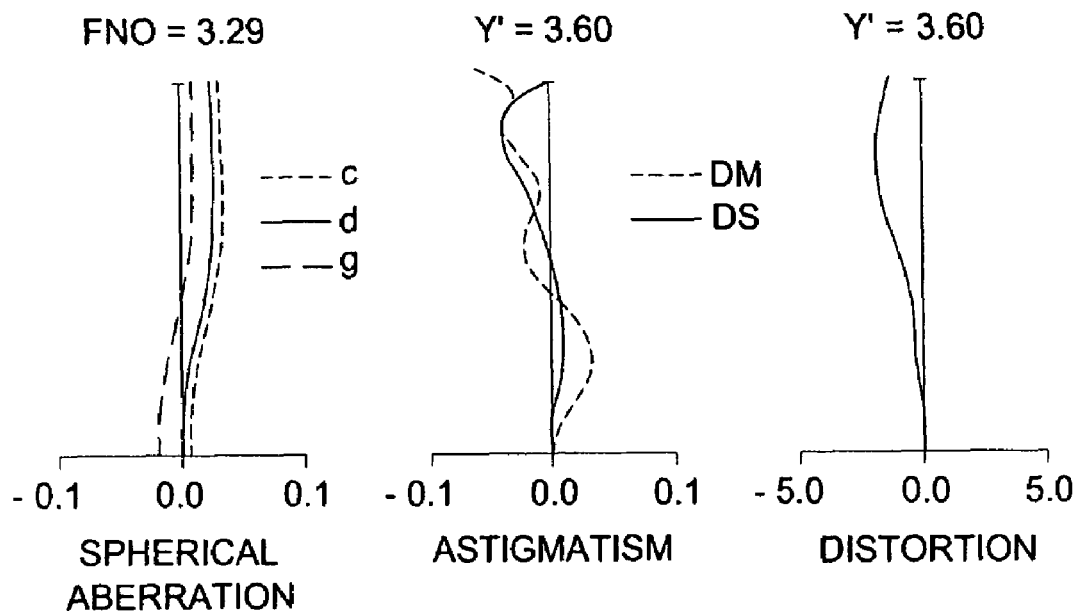
FIGS. 15(a) to 15(c) are diagrams showing aberrations of an image pickup lens in the fifth embodiment.
Figures 16A, 16B, 16C:
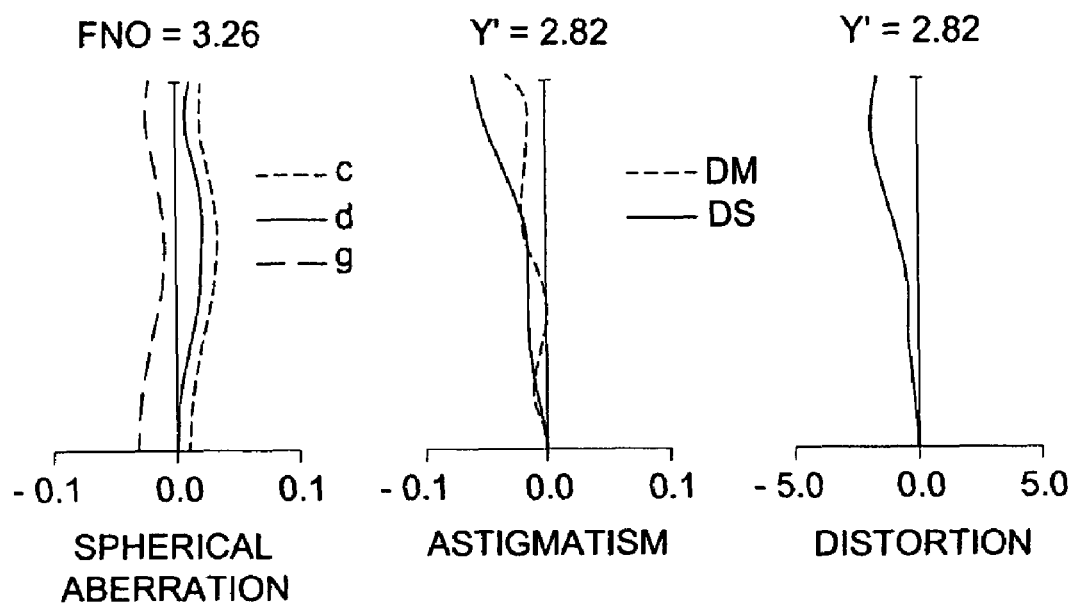
FIGS. 16(a) to 16(c) are diagrams showing aberrations of an image pickup lens in the sixth embodiment.
Figures 20A, 20B, 20C:
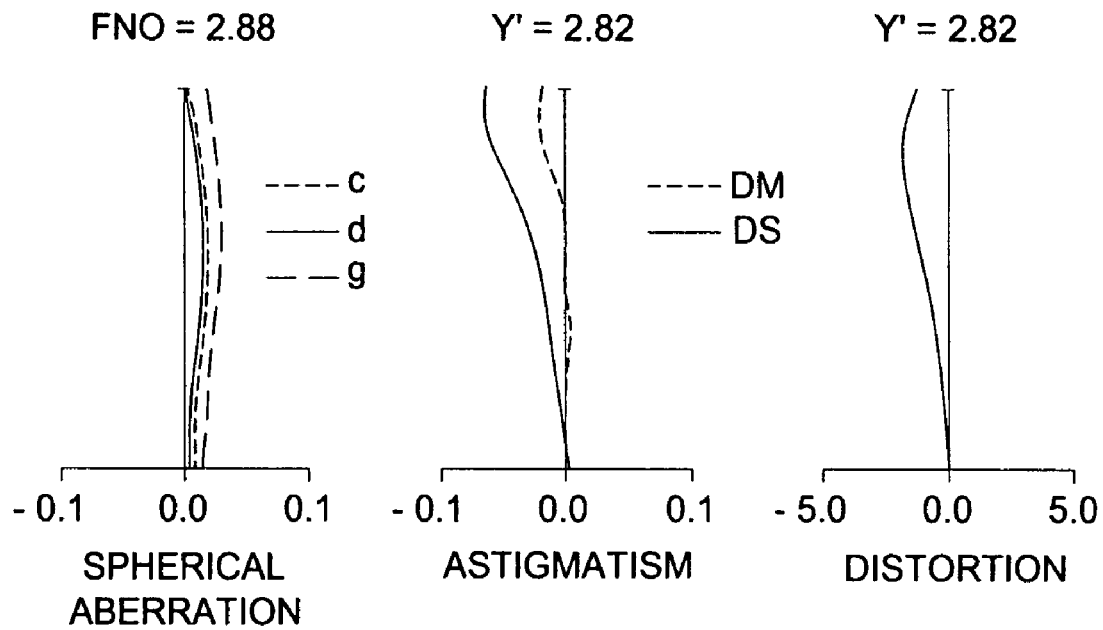
FIGS. 20(a) to 20(c) are diagrams showing aberrations of an image pickup lens in the eighth embodiment.
Figures 21A, 21B, 21C:
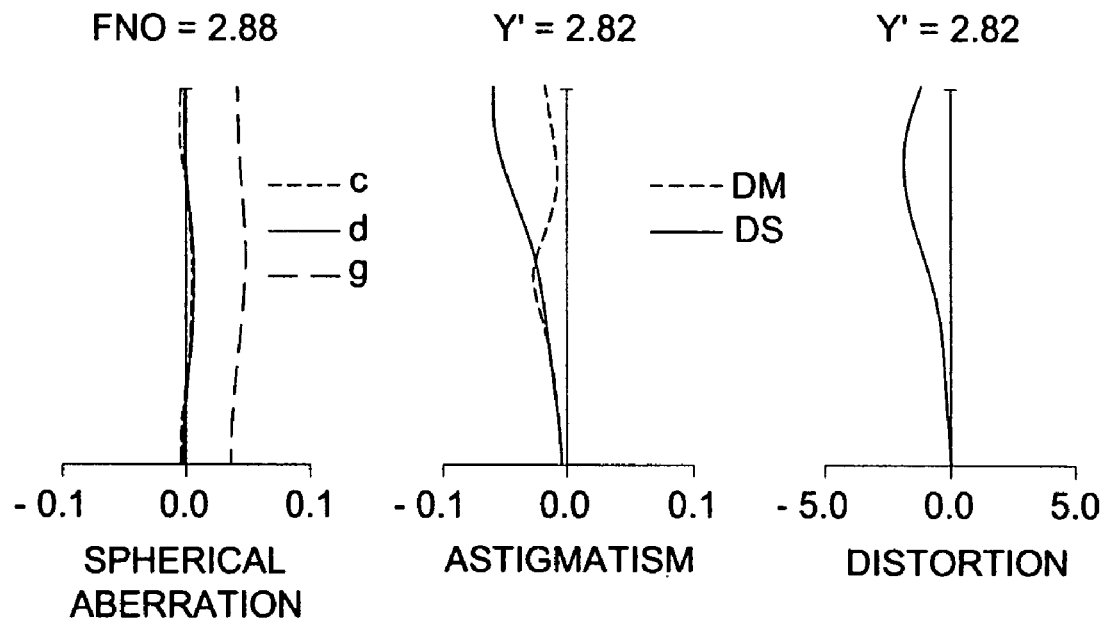
FIGS. 21(a) to 21(c) are diagrams showing aberrations of an image pickup lens in the ninth embodiment.

On the aberration diagrams shown in FIGS. 11(*a*) to 17(*c*), and FIGS. 20(*a*) to 21(*c*) corresponding to the First Example to Ninth Example, line c of spherical aberration diagram indicates aberration for c line, line d indicates aberration for d line, line g indicates aberration for g line, and line DM and line DS of astigmatism diagram are respectively aberration on a meridional surface and aberration on a sagittal surface. A unit for the abscissa axis of distortion is a percentage and a unit for all other axes is a millimeter.

Table 21 shows values of conditional expressions corresponding to respective examples, and all respective examples satisfy the conditional expressions.

Example 1

TABLE 3

| | f = 4.83 | fB = 0.82 | F = 2.88 | 2Y = 5.63 | |
|---|---|---|---|---|---|
| Surface No. | Curvature radius (r) | Axial distance (d) | Refractive index (N) | Abbe number (ν) | |
| Diaphragm | ∞ | 0.05 | | | |
| 1 | 2.547 | 1.00 | 1.53180 | 56.0 | |
| 2 | −5.329 | 0.10 | | | |
| 3 | 8.764 | 0.58 | 1.58300 | 30.0 | |
| 4 | 1.829 | 0.70 | | | |
| 5 | −14.166 | 1.18 | 1.53180 | 56.0 | |
| 6 | −1.526 | 0.12 | | | |
| 7 | 4.713 | 0.75 | 1.53180 | 56.0 | |
| 8 | 1.270 | 0.60 | | | |
| 9 | ∞ | 0.30 | 1.51633 | 64.1 | |
| 10 | ∞ | | | | |

TABLE 4

Aspheric surface data

| | Aspheric surface coefficient |
|---|---|
| 1st surface | K = 2.46080E−01<br>A4 = −7.24747E−03<br>A6 = 2.86131E−03<br>A8 = −8.01964E−03<br>A10 = 4.22259E−03 |
| 2nd surface | K = −1.38805E+01<br>A4 = 9.33357E−03<br>A6 = 2.41644E−03<br>A8 = 2.41086E−03<br>A10 = −4.19755E−03 |
| 3rd surface | K = 2.66729E+01<br>A4 = −3.03043E−02<br>A6 = 6.88966E−03<br>A8 = 1.66187E−02<br>A10 = −1.03492E−02 |
| 4th surface | K = −1.43967E+00<br>A4 = −2.70965E−02<br>A6 = 1.24262E−02<br>A8 = 3.82507E−03<br>A10 = −1.71026E−04<br>A12 = −8.24292E−04 |
| 5th surface | K = −1.29781E+01<br>A4 = 4.66367E−02<br>A6 = −2.51881E−02<br>A8 = 8.11055E−03<br>A10 = −1.12528E−03<br>A12 = 9.06829E−05 |
| 6th surface | K = −5.49050E+00<br>A4 = −2.43556E−02<br>A6 = 1.22710E−02<br>A8 = −3.14517E−03 |

TABLE 4-continued

Aspheric surface data

| | Aspheric surface coefficient |
|---|---|
| | A10 = 1.28855E−03<br>A12 = −1.79633E−04 |
| 7th surface | K = 1.27233E−01<br>A4 = −8.84671E−02<br>A6 = 1.81571E−02<br>A8 = −7.71506E−04<br>A10 = −1.02829E−04<br>A12 = 7.06265E−06 |
| 8th surface | K = −6.03950E+00<br>A4 = −5.35156E−02<br>A6 = 1.15430E−02<br>A8 = −1.99213E−03<br>A10 = 2.06251E−04<br>A12 = −8.81230E−06 |

Example 2

TABLE 5

| | f = 4.80 | fB = 0.62 | F = 2.88 | 2Y = 5.63 | |
|---|---|---|---|---|---|
| Surface No. | Curvature radius (r) | Axial distance (d) | Refractive index (N) | Abbe number (ν) | |
| Diaphragm | ∞ | 0.05 | | | |
| 1 | 2.757 | 0.95 | 1.58913 | 61.2 | |
| 2 | −8.678 | 0.10 | | | |
| 3 | 5.793 | 0.56 | 1.58300 | 30.0 | |
| 4 | 1.887 | 0.70 | | | |
| 5 | −10.156 | 1.18 | 1.53180 | 56.0 | |
| 6 | −1.398 | 0.26 | | | |
| 7 | −123.873 | 0.73 | 1.53180 | 56.0 | |
| 8 | 1.681 | 0.70 | | | |
| 9 | ∞ | 0.30 | 1.51633 | 64.1 | |
| 10 | ∞ | | | | |

TABLE 6

| Aspheric surface data | Aspheric surface coefficient |
|---|---|
| 1st surface | K = 3.16469E+00<br>A4 = −2.12081E−02<br>A6 = −1.43118E−02<br>A8 = 1.16377E−02<br>A10 = −1.05943E−02 |
| 2nd surface | K = −2.85101E+01<br>A4 = 1.31557E−02<br>A6 = −1.33047E−02<br>A8 = 2.34984E−02<br>A10 = −1.36327E−02 |
| 3rd surface | K = 4.23980E+00<br>A4 = −1.49687E−02<br>A6 = −1.06142E−02<br>A8 = 2.94460E−02<br>A10 = −1.38061E−02 |
| 4th surface | K = −3.14330E−01<br>A4 = −2.50576E−02<br>A6 = −7.50162E−03<br>A8 = 9.99244E−03<br>A10 = −1.04369E−04<br>A12 = −1.32340E−03 |
| 5th surface | K = −2.99859E+01<br>A4 = 2.22154E−02<br>A6 = 7.40868E−03<br>A8 = −1.19077E−02<br>A10 = 5.84300E−03<br>A12 = −1.08504E−03 |

TABLE 6-continued

| Aspheric surface data | Aspheric surface coefficient |
|---|---|
| 6th surface | K = −3.98791E+00 |
| | A4 = −1.82628E−02 |
| | A6 = 1.48695E−02 |
| | A8 = −3.30679E−03 |
| | A10 = 1.33229E−03 |
| | A12 = −2.34428E−04 |
| 7th surface | K = 0.00000E+00 |
| | A4 = −3.67733E−02 |
| | A6 = 7.67427E−03 |
| | A8 = −3.77719E−04 |
| | A10 = 2.75372E−05 |
| | A12 = −4.61185E−06 |
| 8th surface | K = −8.82593E+00 |
| | A4 = −4.44073E−02 |
| | A6 = 8.69524E−03 |
| | A8 = −1.43056E−03 |
| | A10 = 1.20868E−04 |
| | A12 = −3.33437E−06 |

Example 3

TABLE 7

| f = 4.69 | fB = 0.64 | F = 2.88 | 2Y = 5.63 | |
|---|---|---|---|---|
| Surface No. | Curvature radius (r) | Axial distance (d) | Refractive index (N) | Abbe number (ν) |
| Diaphragm | ∞ | 0.05 | | |
| 1 | 3.268 | 1.05 | 1.53180 | 56.0 |
| 2 | −2.759 | 0.10 | | |
| 3 | 16.098 | 0.60 | 1.58300 | 30.0 |
| 4 | 1.823 | 0.70 | | |
| 5 | −10.205 | 1.14 | 1.53180 | 56.0 |
| 6 | −1.500 | 0.10 | | |
| 7 | 3.580 | 0.72 | 1.53180 | 56.0 |
| 8 | 1.130 | 0.63 | | |
| 9 | ∞ | 0.50 | 1.51633 | 64.1 |
| 10 | ∞ | | | |

TABLE 8

| Aspheric surface data | Aspheric surface coefficient |
|---|---|
| 1st surface | K = −1.80265E+00 |
| | A4 = −1.71940E−02 |
| | A6 = 2.50615E−03 |
| | A8 = −2.07914E−02 |
| | A10 = 7.60132E−03 |
| 2nd surface | K = −1.97876E+00 |
| | A4 = −1.80320E−03 |
| | A6 = −1.97521E−02 |
| | A8 = 1.23806E−02 |
| | A10 = −6.58985E−03 |
| 3rd surface | K = 1.70678E+01 |
| | A4 = −3.53785E−02 |
| | A6 = 9.89517E−03 |
| | A8 = 1.58730E−02 |
| | A10 = −7.75782E−03 |
| 4th surface | K = −2.08066E+00 |
| | A4 = −2.37477E−02 |
| | A6 = 1.54202E−02 |
| | A8 = −5.14227E−04 |
| | A10 = 2.69461E−03 |
| | A12 = −1.44926E−03 |
| 5th surface | K = −5.00000E+01 |
| | A4 = 5.43913E−02 |
| | A6 = −3.13786E−02 |
| | A8 = 9.67993E−03 |

TABLE 8-continued

| Aspheric surface data | Aspheric surface coefficient |
|---|---|
| | A10 = −1.63388E−03 |
| | A12 = 1.53393E−04 |
| 6th surface | K = −5.58262E+00 |
| | A4 = −2.20273E−02 |
| | A6 = 1.37175E−02 |
| | A8 = −4.29377E−03 |
| | A10 = 1.32089E−03 |
| | A12 = −1.66477E−04 |
| 7th surface | K = −2.57765E+00 |
| | A4 = −9.77097E−02 |
| | A6 = 2.02749E−02 |
| | A8 = −7.36563E−04 |
| | A10 = −1.38436E−04 |
| | A12 = 8.84746E−06 |
| 8th surface | K = −5.03904E+00 |
| | A4 = −5.85518E−02 |
| | A6 = 1.33492E−02 |
| | A8 = −2.37193E−03 |
| | A10 = 2.64882E−04 |
| | A12 = −1.24587E−05 |

Example 4

TABLE 9

| f = 4.83 | fB = 0.79 | F = 3.29 | 2Y = 5.63 | |
|---|---|---|---|---|
| Surface No. | Curvature radius (r) | Axial distance (d) | Refractive index (N) | Abbe number (ν) |
| Diaphragm | ∞ | 0.05 | | |
| 1 | 2.306 | 0.94 | 1.53180 | 56.0 |
| 2 | −3.935 | 0.11 | | |
| 3 | −10.405 | 0.60 | 1.58300 | 30.0 |
| 4 | 1.949 | 0.71 | | |
| 5 | 24.384 | 1.33 | 1.58913 | 61.2 |
| 6 | −1.638 | 0.10 | | |
| 7 | 6.823 | 0.75 | 1.53180 | 56.0 |
| 8 | 1.361 | 0.60 | | |
| 9 | ∞ | 0.50 | 1.51633 | 64.1 |
| 10 | ∞ | | | |

TABLE 10

| Aspheric surface data | Aspheric surface coefficient |
|---|---|
| 1st surface | K = 1.99988E−01 |
| | A4 = −6.48741E−02 |
| | A6 = 1.53743E−03 |
| | A8 = −1.69200E−03 |
| 2nd surface | K = −1.76347E+01 |
| 3rd surface | K = 1.38922E+01 |
| | A4 = −3.43784E−02 |
| | A6 = 9.99487E−03 |
| | A8 = −2.55895E−05 |
| 4th surface | K = −4.72869E+00 |
| | A4 = 4.96889E−03 |
| | A6 = 4.56676E−03 |
| | A8 = 1.11161E−03 |
| 5th surface | K = −3.83585E+01 |
| | A4 = 1.97972E−02 |
| | A6 = −3.32695E−03 |
| | A8 = 2.19949E−04 |
| 6th surface | K = −5.57146E+00 |
| | A4 = −2.80667E−02 |
| | A6 = 1.65544E−02 |
| | A8 = −1.15439E−03 |
| | A10 = −2.40965E−04 |
| | A12 = 2.77508E−05 |

TABLE 10-continued

| Aspheric surface data | Aspheric surface coefficient |
|---|---|
| 7th surface | K = −5.00000E+01<br>A4 = −5.41726E−02<br>A6 = 1.68951E−02<br>A8 = −1.75865E−03<br>A10 = 5.87354E−05<br>A12 = 8.86792E−07 |
| 8th surface | K = −6.08227E+00<br>A4 = −4.18467E−02<br>A6 = 9.09918E−03<br>A8 = −1.52774E−03<br>A10 = 1.63764E−04<br>A12 = −5.94103E−06<br>A14 = −9.54291E−08 |

Example 5

TABLE 11 f = 5.60   fB = 0.53   F = 3.29   2Y = 7.20

| Surface No. | Curvature radius (r) | Axial distance (d) | Refractive index (N) | Abbe number (ν) |
|---|---|---|---|---|
| Diaphragm | ∞ | 0.10 | | |
| 1 | 3.000 | 0.90 | 1.53180 | 56.0 |
| 2 | −6.861 | 0.22 | | |
| 3 | 38.621 | 0.60 | 1.58300 | 30.0 |
| 4 | 2.200 | 0.48 | | |
| 5 | 8.960 | 1.18 | 1.53180 | 56.0 |
| 6 | −5.317 | 0.85 | | |
| 7 | 2.002 | 0.80 | 1.58300 | 30.0 |
| 8 | 1.468 | 1.00 | | |
| 9 | ∞ | 0.50 | 1.51633 | 64.1 |
| 10 | ∞ | | | |

TABLE 12

| Aspheric surface data | Aspheric surface coefficient |
|---|---|
| 1st surface | K = 2.11420E+00<br>A4 = −1.36170E−02<br>A6 = −4.15760E−04<br>A8 = −2.47380E−03 |
| 2nd surface | K = −1.80210E+01<br>A4 = 2.57910E−03<br>A6 = 4.22060E−03<br>A8 = 0.00000E+00 |
| 3rd surface | K = −3.00000E+01<br>A4 = −3.35860E−02<br>A6 = 2.39890E−02<br>A8 = −2.95720E−03 |
| 4th surface | K = −5.04960E+00<br>A4 = 2.43380E−03<br>A6 = 4.57610E−03<br>A8 = 1.57760E−04 |
| 5th surface | K = 1.06840E+01<br>A4 = 1.09060E−02<br>A6 = −1.86580E−03<br>A8 = −1.96520E−04 |
| 6th surface | K = −2.30200E+00<br>A4 = −1.66150E−02<br>A6 = 1.20380E−02<br>A8 = −1.49500E−03<br>A10 = −9.98880E−05<br>A12 = 1.45890E−05 |
| 7th surface | K = −4.81610E+00<br>A4 = −4.88780E−02<br>A6 = 6.57560E−03<br>A8 = −1.33550E−04 |

TABLE 12-continued

| Aspheric surface data | Aspheric surface coefficient |
|---|---|
| | A10 = −4.81040E−05<br>A12 = 2.66380E−06 |
| 8th surface | K = −4.04390E+00<br>A4 = −3.30550E−02<br>A6 = 4.37970E−03<br>A8 = −3.91330E−04<br>A10 = 2.08240E−05<br>A12 = −6.23160E−07 |

Example 6

TABLE 13 f = 4.70   fB = 0.81   F = 3.26   2Y = 5.63

| Surface No. | Curvature radius (r) | Axial distance (d) | Refractive index (N) | Abbe number (ν) |
|---|---|---|---|---|
| Diaphragm | ∞ | 0.05 | | |
| 1 | 2.207 | 0.94 | 1.53180 | 56.0 |
| 2 | −6.312 | 0.10 | | |
| 3 | −1726.150 | 0.56 | 1.58300 | 30.0 |
| 4 | 2.433 | 0.63 | | |
| 5 | −5.047 | 1.16 | 1.53180 | 56.0 |
| 6 | −1.283 | 0.10 | | |
| 7 | 4.211 | 0.70 | 1.53180 | 56.0 |
| 8 | 1.160 | 0.55 | | |
| 9 | ∞ | 0.50 | 1.51633 | 64.1 |
| 10 | ∞ | | | |

TABLE 14

| Aspheric surface data | Aspheric surface coefficient |
|---|---|
| 1st surface | K = −1.98080E+00<br>A4 = 1.63010E−02<br>A6 = 1.66971E−02<br>A8 = −8.83407E−03<br>A10 = −3.39110E−03 |
| 2nd surface | K = −5.10353E+00<br>A4 = 2.24977E−02<br>A6 = 1.28009E−02<br>A8 = 1.98675E−03<br>A10 = −5.83842E−03 |
| 3rd surface | K = −3.00000E+01<br>A4 = −8.55284E−02<br>A6 = 1.70462E−02<br>A8 = −2.40422E−03<br>A10 = 6.84641E−05 |
| 4th surface | K = 2.83551E−01<br>A4 = −1.11127E−02<br>A6 = −5.42827E−03<br>A8 = 7.69976E−03<br>A10 = 1.03839E−04<br>A12 = −5.08299E−04 |
| 5th surface | K = 4.61732E+00<br>A4 = 5.32065E−02<br>A6 = −3.03552E−02<br>A8 = 1.11712E−02<br>A10 = −7.20855E−04<br>A12 = −7.03063E−05 |
| 6th surface | K = −4.41668E+00<br>A4 = −5.35561E−02<br>A6 = 3.23473E−02<br>A8 = −1.76804E−02<br>A10 = 7.13447E−03<br>A12 = −9.50534E−04 |
| 7th surface | K = −8.26093E+00<br>A4 = −8.52604E−02<br>A6 = 1.78954E−02 |

TABLE 14-continued

| Aspheric surface data | Aspheric surface coefficient |
|---|---|
| 8th surface | A8 = −6.42071E−04<br>A10 = −1.06989E−04<br>A12 = 6.36207E−06<br>K = −5.68880E+00<br>A4 = −5.78043E−02<br>A6 = 1.21245E−02<br>A8 = −2.06033E−03<br>A10 = 1.97055E−04<br>A12 = −7.36178E−06 |

Example 7

TABLE 15

| | f = 4.71 | fB = 0.72 | F = 3.26 | 2Y = 5.63 | |
|---|---|---|---|---|---|
| Surface No. | Curvature radius (r) | Axial distance (d) | Refractive index (N) | Abbe number (ν) |
| Diaphragm | ∞ | 0.05 | | |
| 1 | 2.71 | 0.95 | 1.53180 | 56.0 |
| 2 | −4.47 | 0.10 | | |
| 3 | 6.81 | 0.60 | 1.58300 | 30.0 |
| 4 | 1.62 | 0.65 | | |
| 5 | 1026.43 | 1.21 | 1.53180 | 56.0 |
| 6 | −2.01 | 0.10 | | |
| 7 | 2.67 | 0.70 | 1.53180 | 56.0 |
| 8 | 1.21 | 0.57 | | |
| 9 | ∞ | 0.50 | 1.51633 | 64.1 |
| 10 | ∞ | | | |

TABLE 16

| Aspheric surface data | Aspheric surface coefficient |
|---|---|
| 1st surface | K = −1.27315E+00<br>A4 = 2.37472E−03<br>A6 = −7.39849E−03<br>A8 = −3.93249E−04<br>A10 = 3.18923E−03 |
| 2nd surface | K = −2.33938E+00<br>A4 = 8.31725E−03<br>A6 = −2.22118E−03<br>A8 = 6.89932E−03<br>A10 = −3.90523E−03 |
| 3rd surface | K = 2.00000E+01<br>A4 = −5.66119E−02<br>A6 = 2.13853E−02<br>A8 = 2.07431E−02<br>A10 = −1.49886E−02 |
| 4th surface | K = −1.42207E+00<br>A4 = −4.03296E−02<br>A6 = 6.25432E−03<br>A8 = 2.68451E−02<br>A10 = −1.26632E−02<br>A12 = 5.55022E−04 |
| 5th surface | K = 2.00000E+01<br>A4 = 5.98135E−02<br>A6 = −3.47576E−02<br>A8 = 6.35080E−03<br>A10 = 1.67273E−03<br>A12 = −5.00368E−04 |
| 6th surface | K = −4.76784E+00<br>A4 = −1.27267E−02<br>A6 = 2.88984E−02<br>A8 = −1.97854E−02<br>A10 = 5.83531E−03<br>A12 = −5.92593E−04 |
| 7th surface | K = −2.00000E+01<br>A4 = −7.22473E−02 |

TABLE 16-continued

| Aspheric surface data | Aspheric surface coefficient |
|---|---|
| 8th surface | A6 = 1.65015E−02<br>A8 = −2.63896E−03<br>A10 = 4.56191E−04<br>A12 = −3.89571E−05<br>K = −5.27086E+00<br>A4 = −6.26944E−02<br>A6 = 1.21077E−02<br>A8 = −1.36459E−03<br>A10 = 4.61000E−05<br>A12 = 1.77424E−06 |

Example 8

TABLE 17

| | f = 4.67 | fB = 0.80 | F = 2.88 | 2Y = 5.63 | |
|---|---|---|---|---|---|
| Surface No. | Curvature radius (r) | Axial distance (d) | Refractive index (N) | Abbe number (ν) |
| Diaphragm | ∞ | 0.05 | | |
| 1 | 2.49 | 1.03 | 1.53180 | 56.0 |
| 2 | −4.97 | 0.10 | | |
| 3 | 11.11 | 0.56 | 1.63219 | 23.4 |
| 4 | 1.98 | 0.66 | | |
| 5 | −14.02 | 1.16 | 1.53180 | 56.0 |
| 6 | −1.52 | 0.10 | | |
| 7 | 4.41 | 0.74 | 1.53180 | 56.0 |
| 8 | 1.28 | 0.60 | | |
| 9 | ∞ | 0.30 | 1.51633 | 64.1 |
| 10 | ∞ | | | |

TABLE 18

| Aspheric surface data | Aspheric surface coefficient |
|---|---|
| 1st surface | K = 1.88507E−01<br>A4 = −8.78966E−03<br>A6 = 7.44883E−03<br>A8 = −1.37491E−02<br>A10 = 5.61078E−03 |
| 2nd surface | K = −8.05010E+00<br>A4 = 3.48385E−03<br>A6 = −5.87918E−03<br>A8 = 7.00736E−03<br>A10 = −5.10709E−03 |
| 3rd surface | K = −1.06883E+01<br>A4 = −3.89002E−02<br>A6 = 8.35464E−03<br>A8 = 1.56862E−02<br>A10 = −8.99781E−03 |
| 4th surface | K = −1.58996E+00<br>A4 = −2.77053E−02<br>A6 = 1.21198E−02<br>A8 = 4.06236E−03<br>A10 = −3.95199E−04<br>A12 = −7.56156E−04 |
| 5th surface | K = −2.78548E+01<br>A4 = 4.66062E−02<br>A6 = −2.56740E−02<br>A8 = 8.48231E−03<br>A10 = −1.05148E−03<br>A12 = 2.81794E−05 |
| 6th surface | K = −5.11978E+00<br>A4 = −2.24273E−02<br>A6 = 1.17612E−02<br>A8 = −3.12676E−03<br>A10 = 1.28832E−03<br>A12 = −1.76056E−04 |

TABLE 18-continued

| Aspheric surface data | Aspheric surface coefficient |
|---|---|
| 7th surface | K = −4.52158E−01 |
|  | A4 = −8.86045E−02 |
|  | A6 = 1.78156E−02 |
|  | A8 = −7.67204E−04 |
|  | A10 = −9.87391E−05 |
|  | A12 = 7.38922E−06 |
| 8th surface | K = −5.90232E+00 |
|  | A4 = −5.47157E−02 |
|  | A6 = 1.16509E−02 |
|  | A8 = −1.98266E−03 |
|  | A10 = 2.01349E−04 |
|  | A12 = −8.49779E−06 |

Example 9

TABLE 19 f = 4.68   fB = 0.74   F = 2.88   2Y = 5.63

| Surface No. | Curvature radius (r) | Axial distance (d) | Refractive index (N) | Abbe number (ν) |
|---|---|---|---|---|
| Diaphragm | ∞ | 0.05 |  |  |
| 1 | 2.77 | 1.14 | 1.59201 | 67.0 |
| 2 | −5.14 | 0.10 |  |  |
| 3 | 13.09 | 0.56 | 1.63219 | 23.4 |
| 4 | 2.00 | 0.66 |  |  |
| 5 | −19.24 | 1.25 | 1.53180 | 56.0 |
| 6 | −1.50 | 0.10 |  |  |
| 7 | 5.05 | 0.76 | 1.53180 | 56.0 |
| 8 | 1.24 | 0.53 |  |  |
| 9 | ∞ | 0.30 | 1.51633 | 64.1 |
| 10 | ∞ |  |  |  |

TABLE 20

| Aspheric surface data | Aspheric surface coefficient |
|---|---|
| 1st surface | K = 1.35559E−01 |
| 2nd surface | A4 = −9.21985E−03 |
|  | A6 = 7.15308E−03 |
|  | A8 = −1.47414E−02 |
|  | A10 = 5.88636E−03 |
|  | K = −4.42529E+00 |
|  | A4 = 6.05381E−04 |
|  | A6 = −7.46532E−03 |
|  | A8 = 6.78094E−03 |
|  | A10 = −5.14924E−03 |
| 3rd surface | K = −1.90054E+01 |
|  | A4 = −3.93194E−02 |
|  | A6 = 8.67095E−03 |
|  | A8 = 1.53699E−02 |
|  | A10 = −9.49086E−03 |
| 4th surface | K = −1.47471E+00 |
|  | A4 = −2.66788E−02 |
|  | A6 = 1.13485E−02 |
|  | A8 = 3.82194E−03 |
|  | A10 = −3.53742E−04 |
|  | A12 = −6.91958E−04 |
| 5th surface | K = −7.44333E+00 |
|  | A4 = 4.67771E−02 |
|  | A6 = −2.54744E−02 |
|  | A8 = 8.50262E−03 |
|  | A10 = −1.05785E−03 |
|  | A12 = 2.32431E−05 |
| 6th surface | K = −5.01149E+00 |
|  | A4 = −2.22566E−02 |
|  | A6 = 1.12925E−02 |
|  | A8 = −3.15800E−03 |
|  | A10 = 1.29641E−03 |
|  | A12 = −1.72768E−04 |
| 7th surface | K = −3.86979E−01 |
|  | A4 = −8.87656E−02 |
|  | A6 = 1.78098E−02 |
|  | A8 = −7.94876E−04 |
|  | A10 = −1.01536E−04 |
|  | A12 = 7.47826E−06 |
| 8th surface | K = −5.53854E+00 |
|  | A4 = −5.54412E−02 |
|  | A6 = 1.15708E−02 |
|  | A8 = −1.96871E−03 |
|  | A10 = 1.99122E−04 |
|  | A12 = −9.10669E−06 |

TABLE 21

|  | Example 1 | Example 2 | Example 3 | Example 4 | Example 5 | Example 6 | Example 7 | Example 8 | Example 9 |
|---|---|---|---|---|---|---|---|---|---|
| (1) r4/f | 0.38 | 0.39 | 0.39 | 0.40 | 0.39 | 0.52 | 0.34 | 0.42 | 0.43 |
| (2) f12/f | 1.65 | 1.53 | 1.57 | 2.31 | 2.86 | 1.49 | 1.78 | 1.68 | 1.63 |
| (3) r8/r6 | −0.83 | −1.05 | −0.75 | −0.83 | −0.28 | −0.90 | −0.60 | −0.84 | −0.82 |
| (4) ν1 − ν2 | 26.0 | 31.2 | 26.0 | 26.0 | 26.0 | 26.0 | 26.0 | 32.6 | 43.6 |
| (5) L/2Y | 1.07 | 1.07 | 1.07 | 1.12 | 1.00 | 1.05 | 1.06 | 1.08 | 1.10 |

It can be seen that each of the image pickup lenses of the above examples includes, in order from an object side thereof: an aperture stop; a first lens having a positive refractive power; a second lens having a negative refractive power and comprising a concave surface facing an image side of the image pickup lens; a third lens having a positive refractive power; and a fourth lens having a negative refractive power and comprising a concave surface facing the image side. In the structure of the above examples, the curvature radius of the second lens facing the image side is configured within a proper range for the focal length of the entire system of the image pickup system. Therefore, it allows to provide an image pickup lens, a image pickup apparatus, and a mobile terminal each of which is small in size, secures a wide field angle, and provides various aberrations which are excellently corrected.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image pickup lens for forming a light flux from a subject into an image on an image pickup element, comprising, in order from an object side thereof:
    an aperture stop;
    a first lens having a positive refractive power;
    a second lens having a negative refractive power and comprising a concave surface facing an image side of the image pickup lens;
    a third lens having a positive refractive power; and
    a fourth lens having a negative refractive power and comprising a concave surface facing the image side,
    wherein the image pickup lens satisfies $0.2 < r4/f \leq 0.52$, where r4 is a curvature radius of the surface facing the image side on the second lens, and
    f is a focal length of the image pickup lens.

2. The image pickup lens of claim 1, wherein the surface facing the image side on the second lens is an aspherical surface such that a farther position on the aspherical surface from an optical axis has a smaller negative refractive power.

3. The image pickup lens of claim 1, wherein the surface facing image side on the fourth lens is an aspherical surface such that a farther position on the aspherical surface from an optical axis has a smaller negative refractive power, the aspherical surface having an inflection point on a periphery of the fourth lens.

4. The image pickup lens of claim 1, wherein a surface facing the image side on the third lens is an aspherical surface such that a farther position on the aspherical surface from an optical axis has a smaller positive refractive power.

5. The image pickup lens of claim 1, satisfying $0.8 < f12/f < 3$, where f12 is a composite focal length of the first lens and the second lens.

6. The image pickup lens of claim 1, satisfying $-1.5 < r8/r6 < -0.2$, where r6 is a curvature radius of a surface facing the image side on the third lens, and
    r8 is a curvature radius of a surface facing the image side on the fourth lens.

7. The image pickup lens of claim 1, satisfying $20 < v1 - v2 < 65$, where v1 is an Abbe number of the first lens, and
    v is an Abbe number of the second lens.

8. The image pickup lens of claim 1, wherein at least one lens of the image pickup lens comprises a plastic.

9. An image pickup apparatus comprising:
    a casing comprising a light-shielding material, and comprising an aperture where a light flux from a subject enters into;
    the image pickup lens of claim 1 housed in the casing, for receiving a light flux passing through the aperture;
    an image pickup element for receiving a light flux guided by the image pickup lens;
    a substrate supporting the image pickup element; and
    a connecting terminal formed on the substrate, for transmitting and receiving electrical signal.

10. The image pickup apparatus of claim 9, wherein the image pickup apparatus has a height of less than 10 mm along an optical axis.

11. A mobile terminal comprising the image pickup apparatus of claim 9.

* * * * *